United States Patent
Asano

(10) Patent No.: US 9,829,776 B2
(45) Date of Patent: Nov. 28, 2017

(54) LIGHT SOURCE DEVICE AND IMAGE DISPLAY DEVICE

(71) Applicant: SONY CORPORATION, Tokyo (JP)

(72) Inventor: Yoshiro Asano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/890,535

(22) PCT Filed: Jul. 14, 2014

(86) PCT No.: PCT/JP2014/003724
§ 371 (c)(1),
(2) Date: Nov. 11, 2015

(87) PCT Pub. No.: WO2015/033505
PCT Pub. Date: Mar. 12, 2015

(65) Prior Publication Data
US 2016/0124292 A1    May 5, 2016

(30) Foreign Application Priority Data

Sep. 3, 2013  (JP) .................................. 2013-182234

(51) Int. Cl.
*G03B 21/16*    (2006.01)
*G03B 21/20*    (2006.01)
(Continued)

(52) U.S. Cl.
CPC ............ *G03B 21/16* (2013.01); *F21V 29/503* (2015.01); *F21V 29/54* (2015.01); *F21V 29/59* (2015.01);
(Continued)

(58) Field of Classification Search
CPC   G03B 21/16; G03B 21/2013; G03B 21/2033; G03B 21/2066; H04N 9/3144;
(Continued)

(56) References Cited

U.S. PATENT DOCUMENTS 7,866,827 B2*  1/2011  Egawa .................. G03B 21/16
353/54
2006/0082732 A1  4/2006  Miwa et al.
(Continued)

FOREIGN PATENT DOCUMENTS

CN         1677227 A      10/2005
CN         1831637 A       9/2006
(Continued)

OTHER PUBLICATIONS

International Search Report dated Nov. 11, 2014, in PCT/JP2014/003724 filed Jul. 14, 2014.
(Continued)

*Primary Examiner* — Sultan Chowdhury
(74) *Attorney, Agent, or Firm* — Oblon, McClelland, Maier & Neustadt, L.L.P.

(57) ABSTRACT

A light source device including a plurality of solid-state light sources, and a cooling member having a plurality of cooling surfaces, the cooling member being configured to cool the plurality of solid-state light sources provided on the respective cooling surfaces.

20 Claims, 16 Drawing Sheets

(51) Int. Cl.
| | |
|---|---|
| *F21V 29/503* | (2015.01) |
| *F21V 29/54* | (2015.01) |
| *F21V 29/58* | (2015.01) |
| *F21V 29/65* | (2015.01) |
| *F21V 29/89* | (2015.01) |
| *F21Y 101/00* | (2016.01) |
| *F21Y 115/30* | (2016.01) |

(52) U.S. Cl.
CPC .............. *F21V 29/65* (2015.01); *F21V 29/89* (2015.01); *G03B 21/2033* (2013.01); *F21Y 2101/00* (2013.01); *F21Y 2115/30* (2016.08)

(58) Field of Classification Search
CPC ....... H04N 9/3161; F21V 29/02; F21V 29/30; F21V 29/56; F21V 29/58
See application file for complete search history.

(56) References Cited

U.S. PATENT DOCUMENTS

| | | | | |
|---|---|---|---|---|
| 2007/0068653 | A1* | 3/2007 | Kondou | F28D 1/0477 165/80.4 |
| 2007/0279938 | A1* | 12/2007 | Miwa | F21V 29/30 362/613 |
| 2009/0237619 | A1* | 9/2009 | Yanagisawa | F25B 21/02 353/54 |
| 2010/0118279 | A1* | 5/2010 | Itsuki | G03B 21/16 353/54 |
| 2010/0302514 | A1* | 12/2010 | Silverstein | G02B 27/1026 353/37 |
| 2012/0069305 | A1* | 3/2012 | Seto | F04B 43/046 353/54 |
| 2012/0257171 | A1 | 10/2012 | Song et al. | |
| 2013/0342765 | A1* | 12/2013 | Asano | H04N 9/3144 348/749 |
| 2014/0300871 | A1 | 10/2014 | Yanagisawa et al. | |

FOREIGN PATENT DOCUMENTS

| | | |
|---|---|---|
| CN | 101546105 A | 9/2009 |
| JP | 2005-148694 A | 6/2005 |
| JP | 2005-284185 A | 10/2005 |
| JP | 2005-300663 A | 10/2005 |
| JP | 2007-12722 A | 1/2007 |
| JP | 2007-94154 A | 4/2007 |
| JP | 2007-165481 | 6/2007 |
| JP | 2007/165481 A | 6/2007 |
| JP | 2007-193990 A | 8/2007 |
| JP | 2008-102304 A | 5/2008 |
| JP | 2008-268616 | 11/2008 |
| JP | 2008/268616 A | 11/2008 |
| JP | 2009-237546 A | 10/2009 |
| JP | 2010-55993 A | 3/2010 |
| JP | 2011-90310 | 5/2011 |
| JP | 2011/090310 A | 5/2011 |

OTHER PUBLICATIONS

Written Opinion of the International Searching Authority dated Nov. 11, 2014, in PCT/JP2014/003724 filed Jul. 14, 2014.
Office Action dated Nov. 1, 2016 in Japanese Patent Application No. 2013-182234.
Combined Chinese Office Action and Search Report dated Mar. 1, 2017, in Patent Application No. 201480046992.X (with English translation).

* cited by examiner

[Fig. 1]
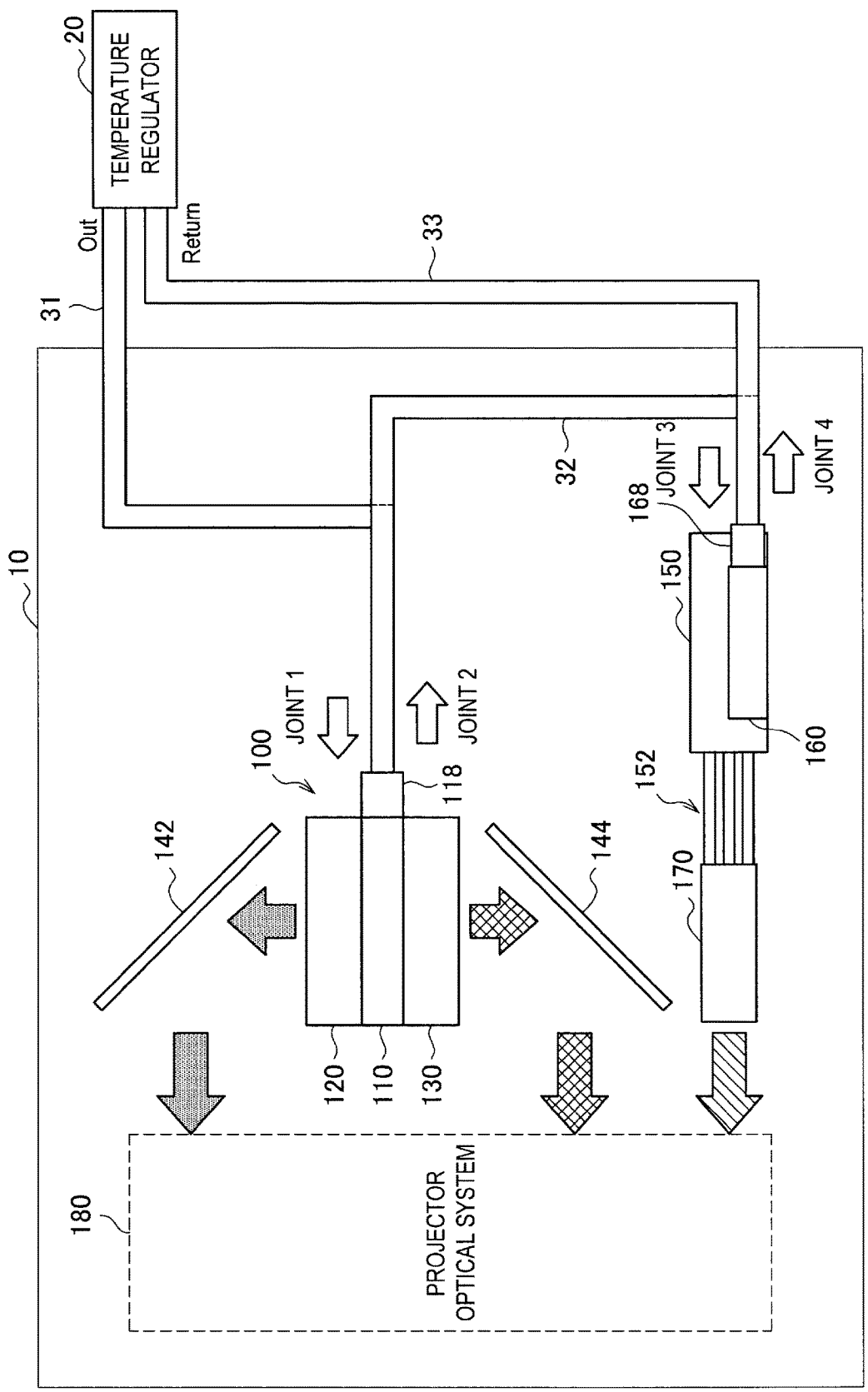

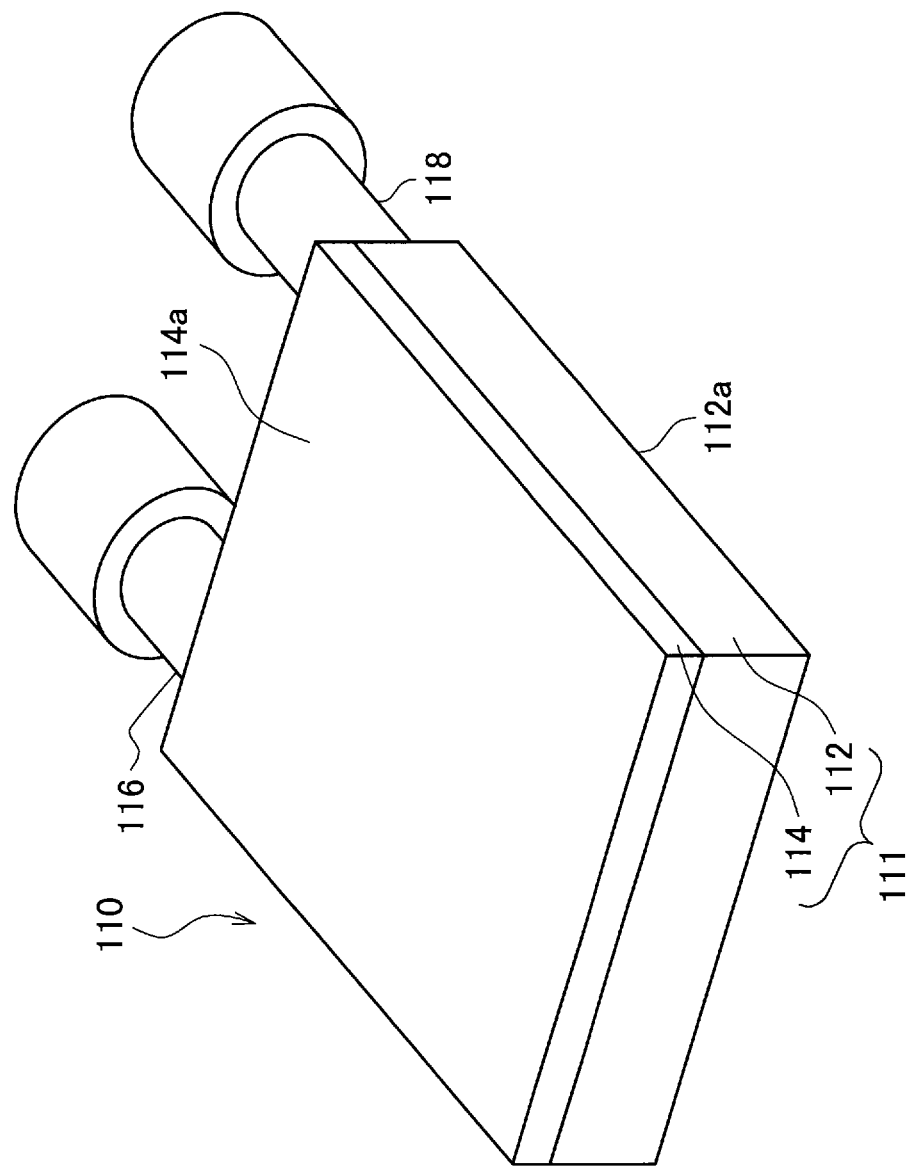
[Fig. 2]

[Fig. 3]
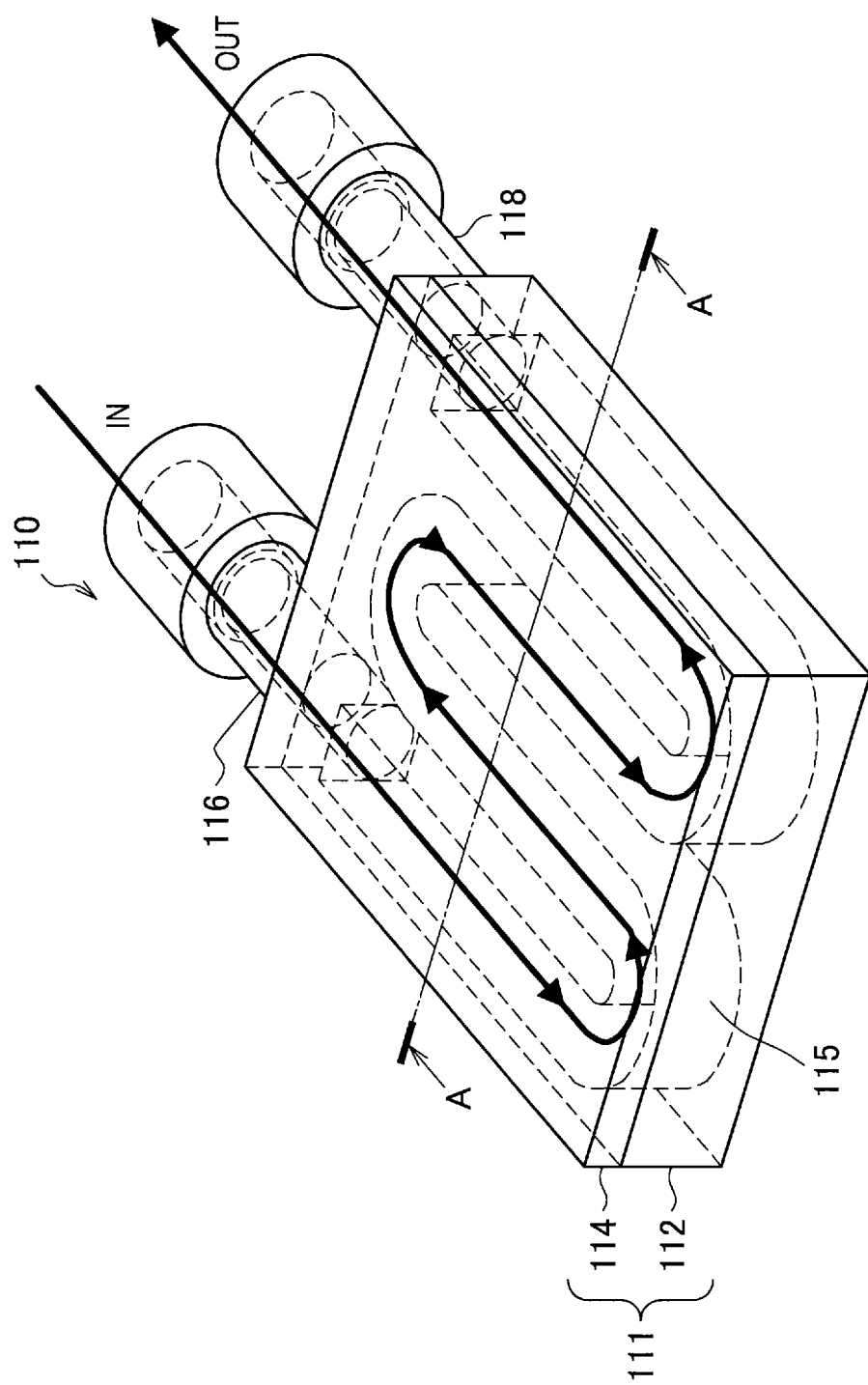

[Fig. 4]
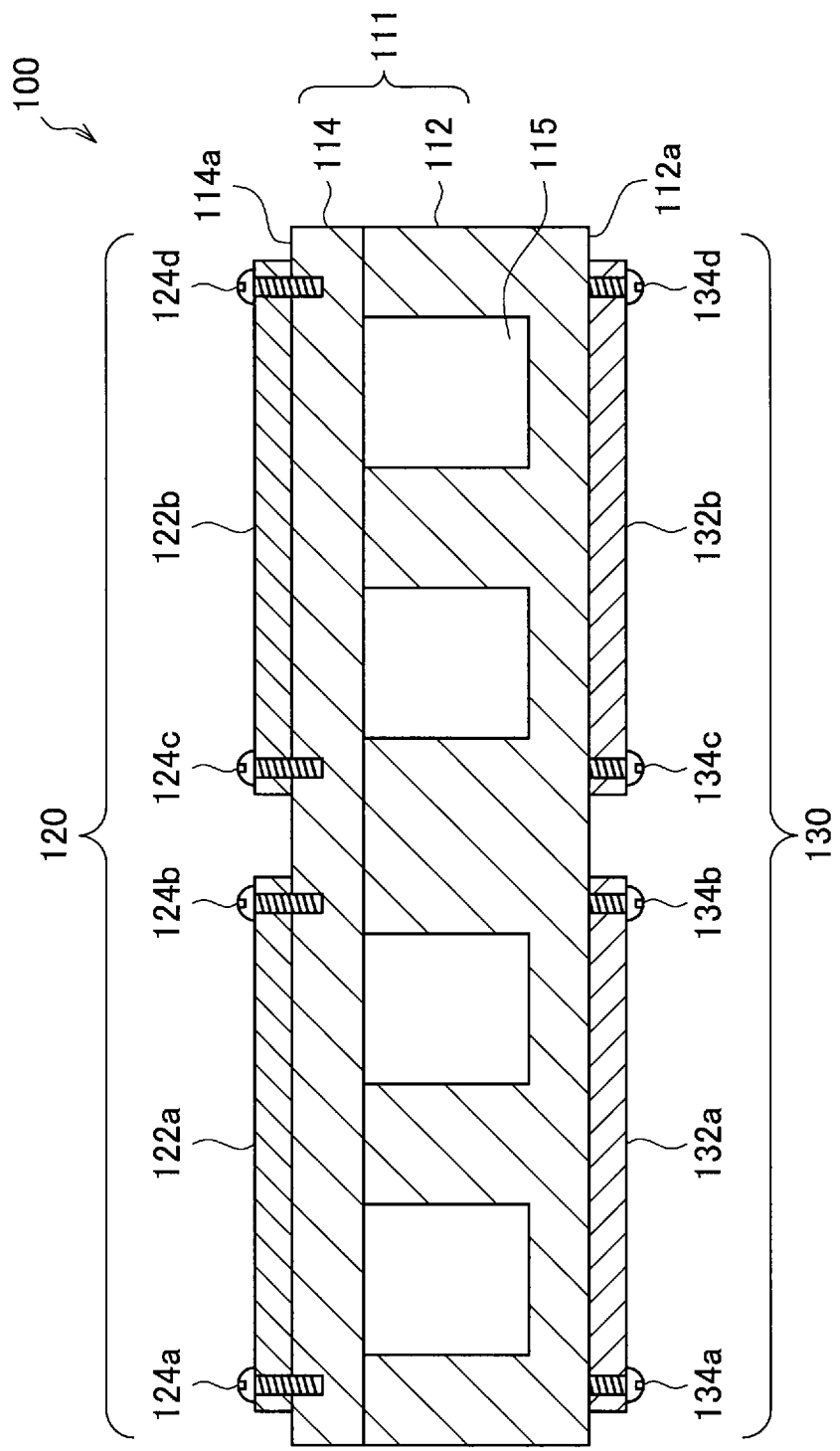

[Fig. 5]
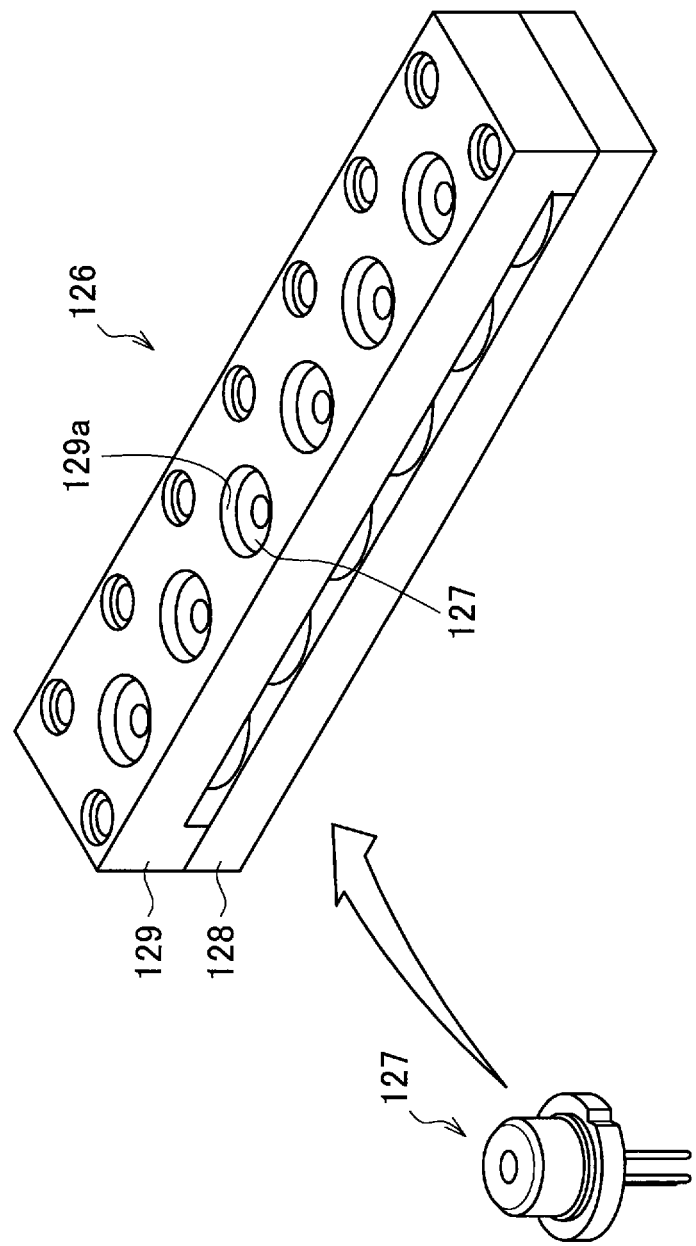

[Fig. 6]
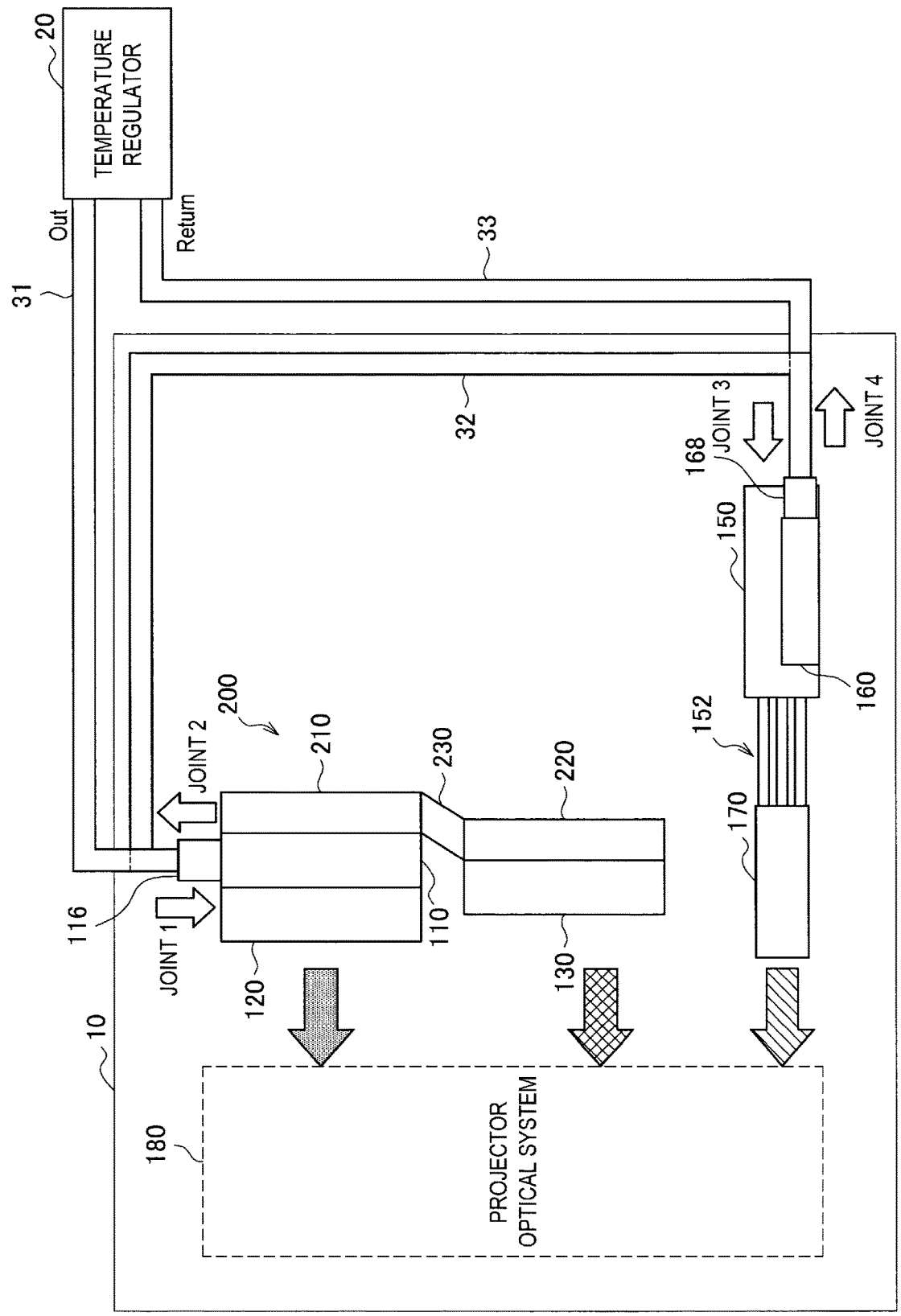

[Fig. 7]
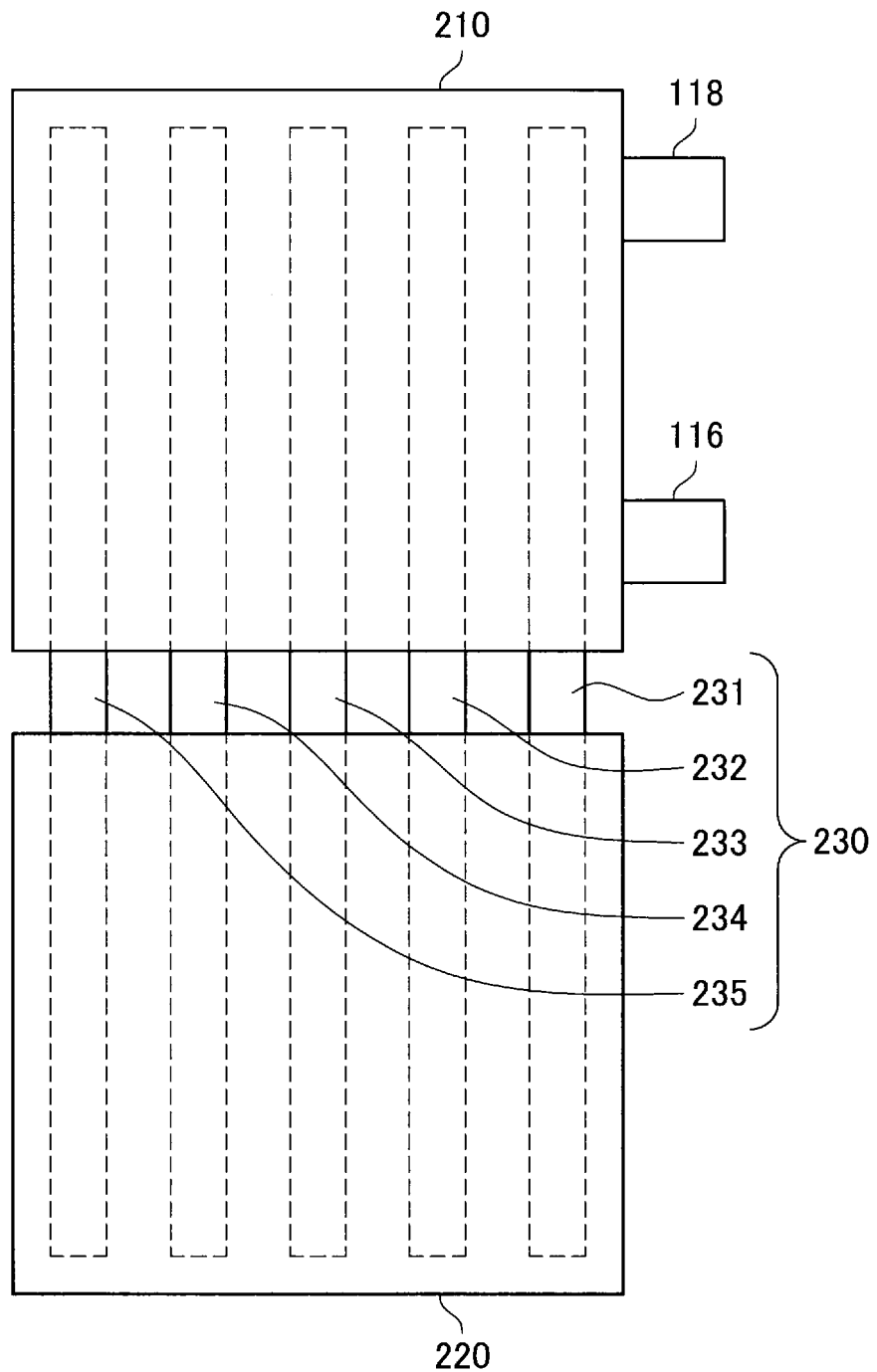

[Fig. 8]
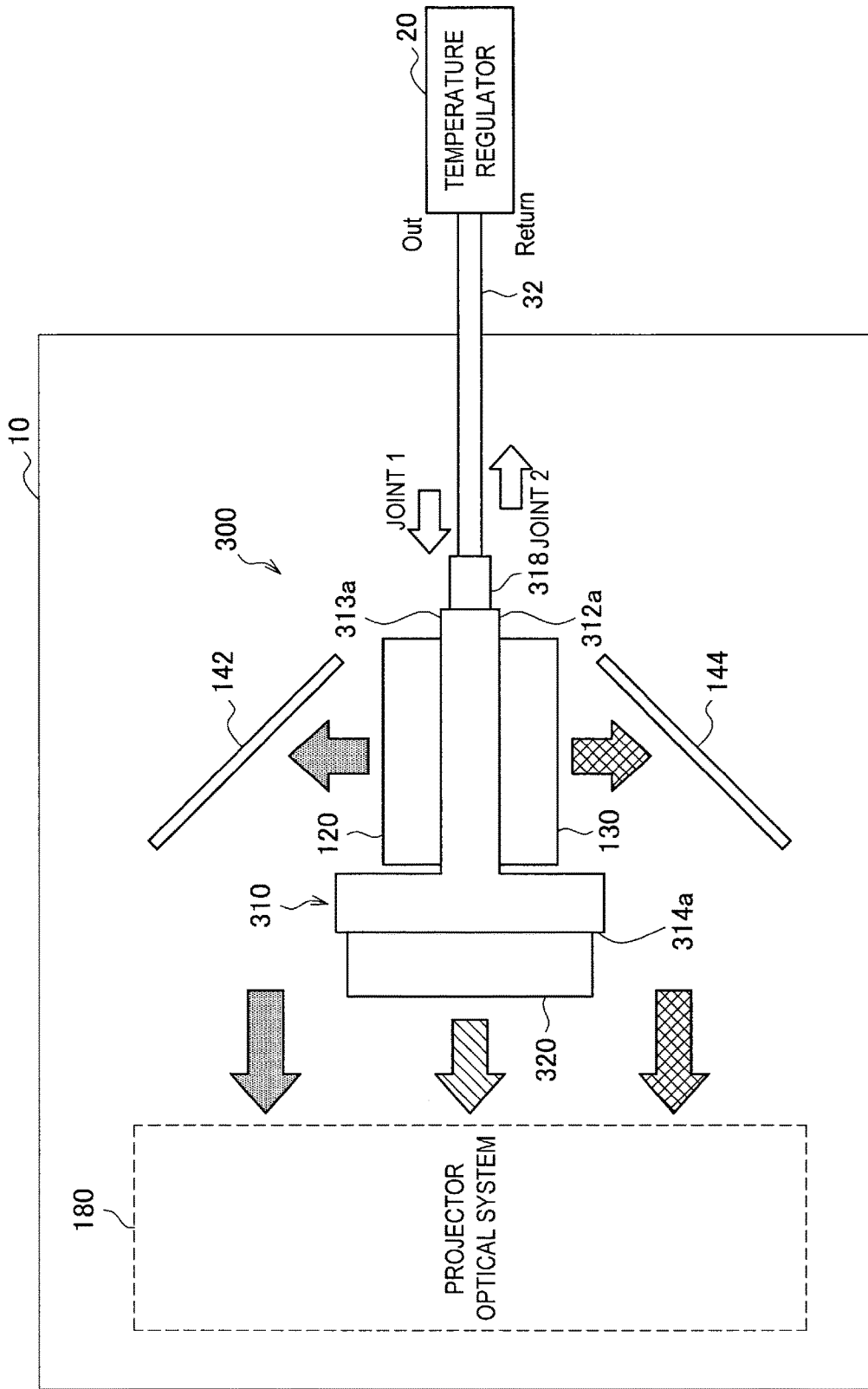

[Fig. 9]
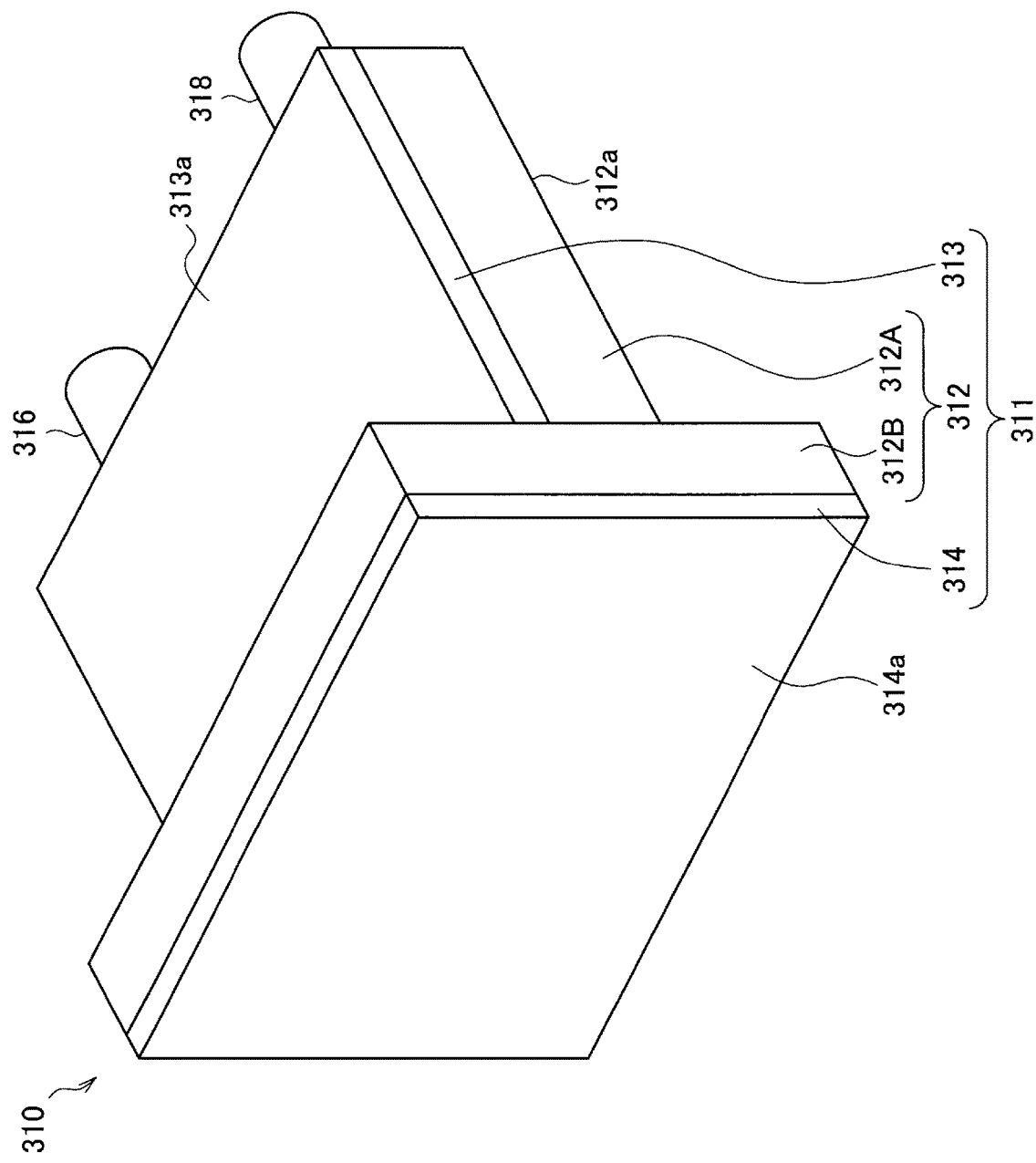

[Fig. 10]
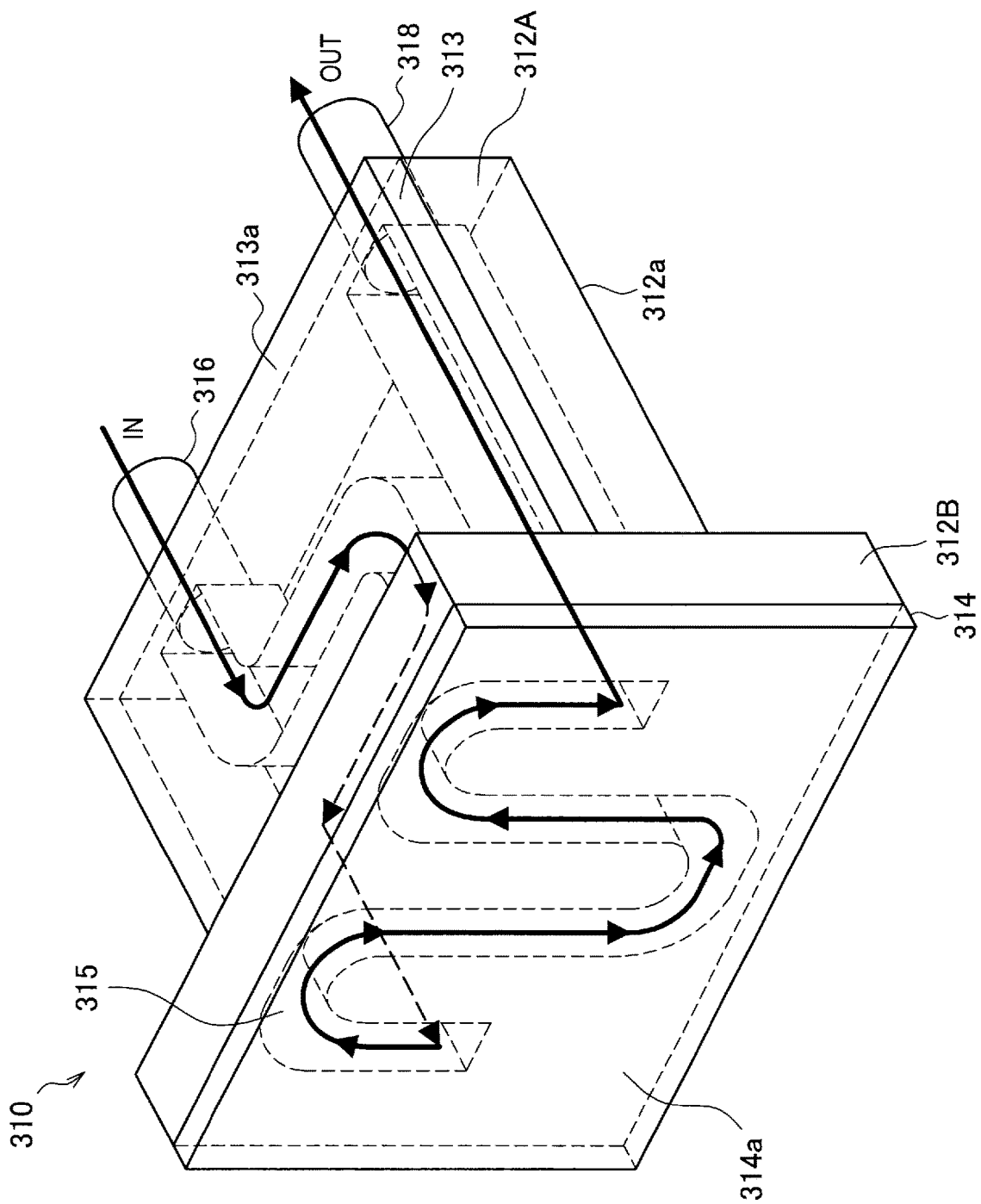

[Fig. 11]
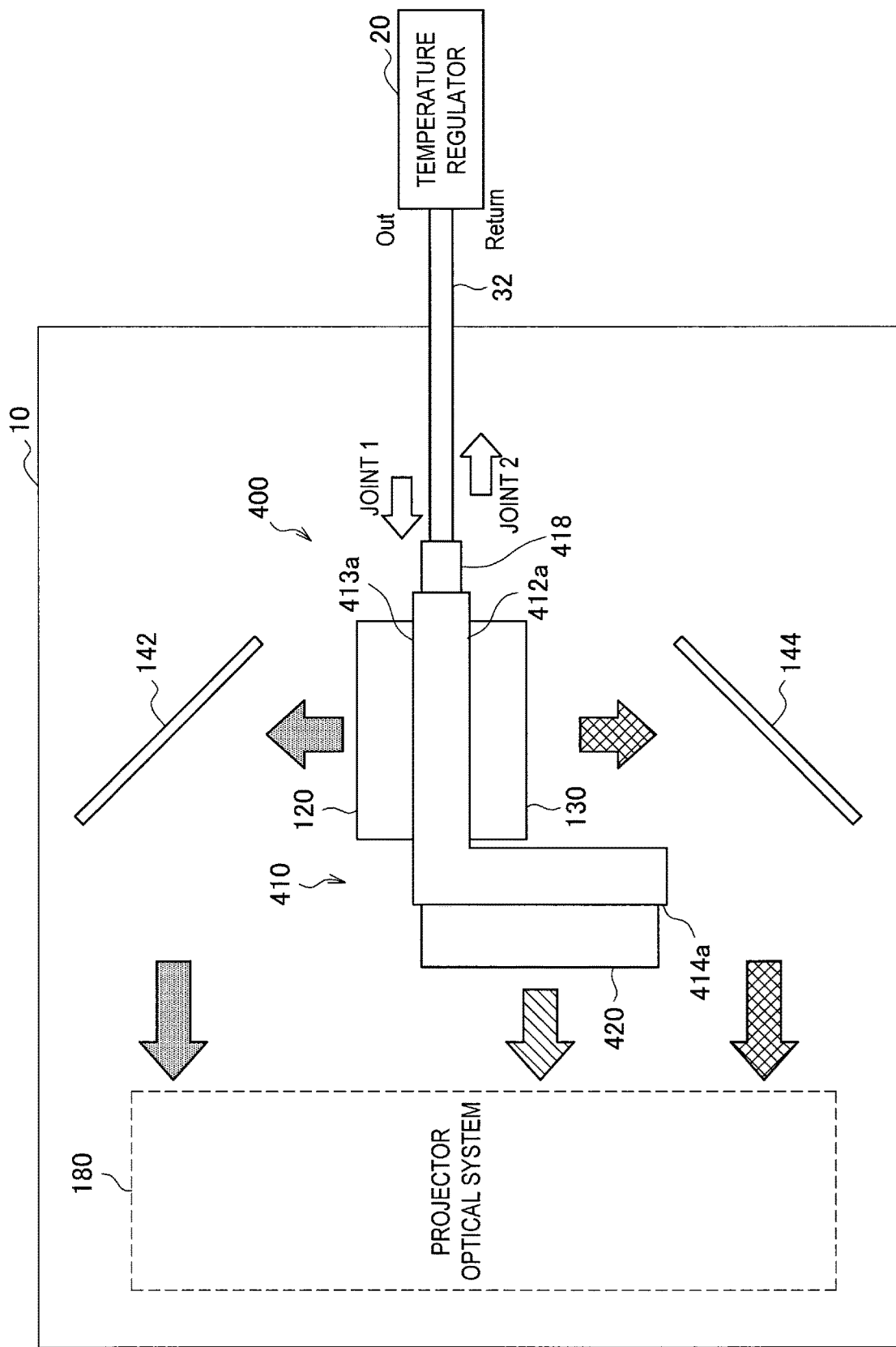

[Fig. 12]
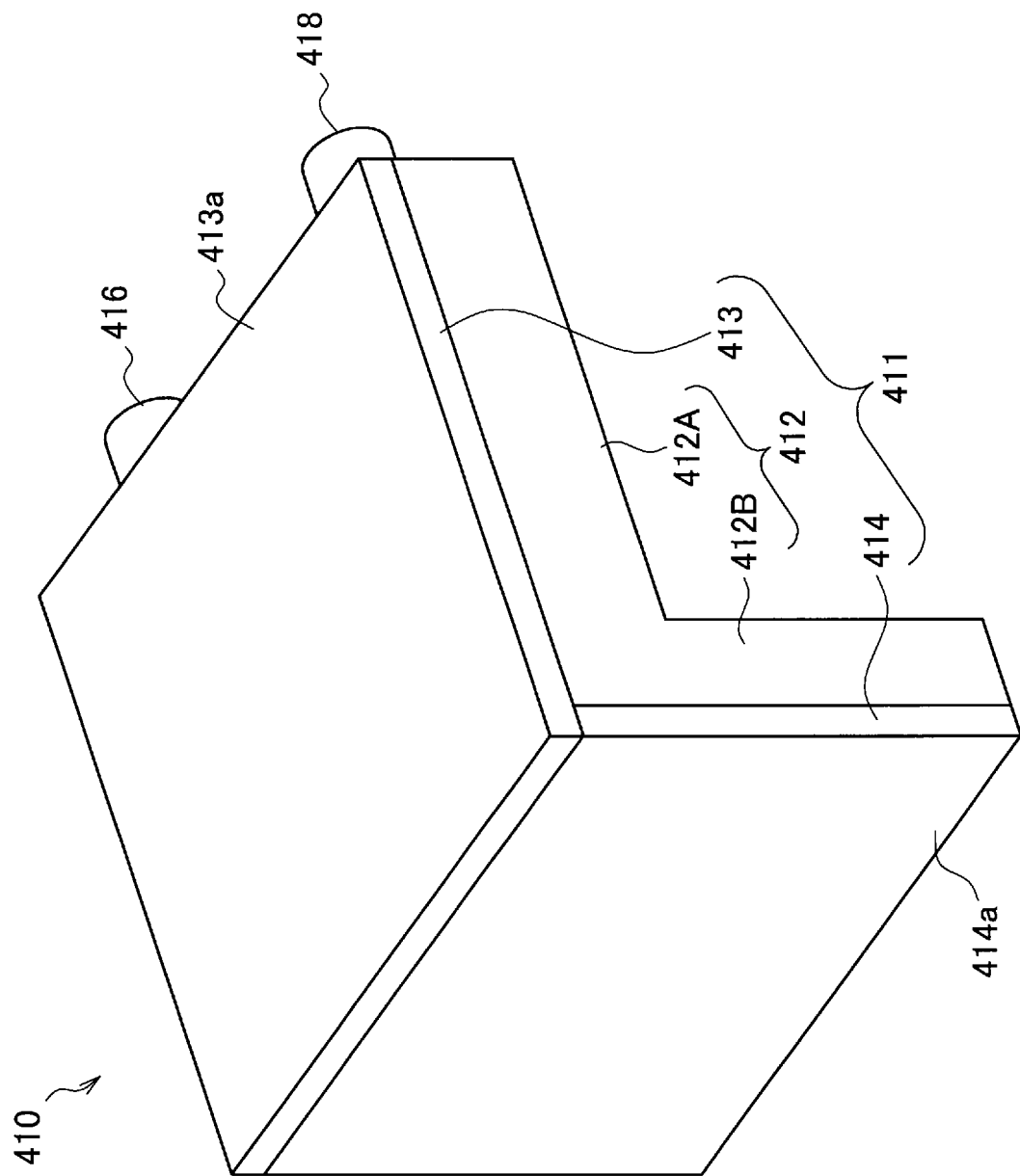

[Fig. 13]
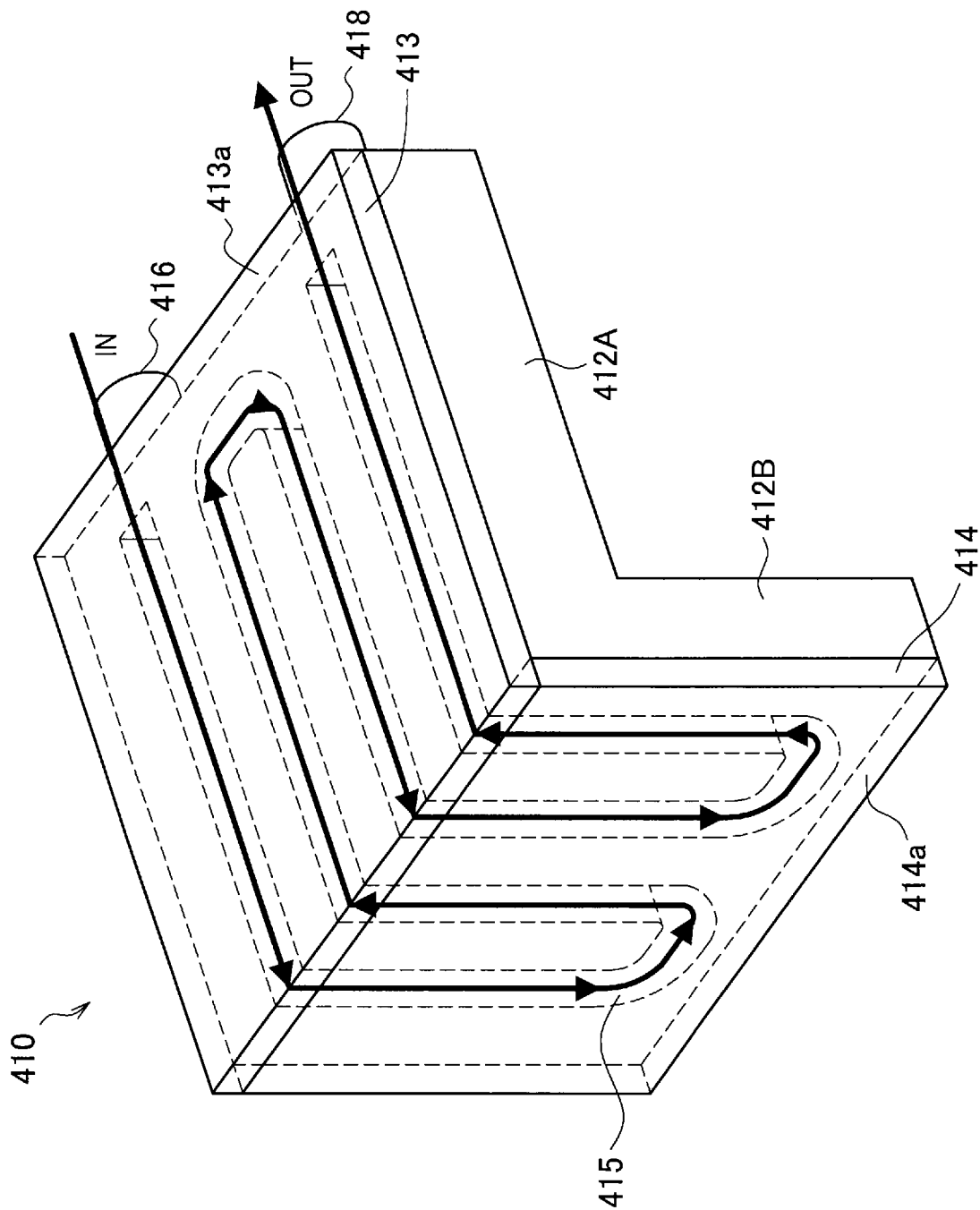

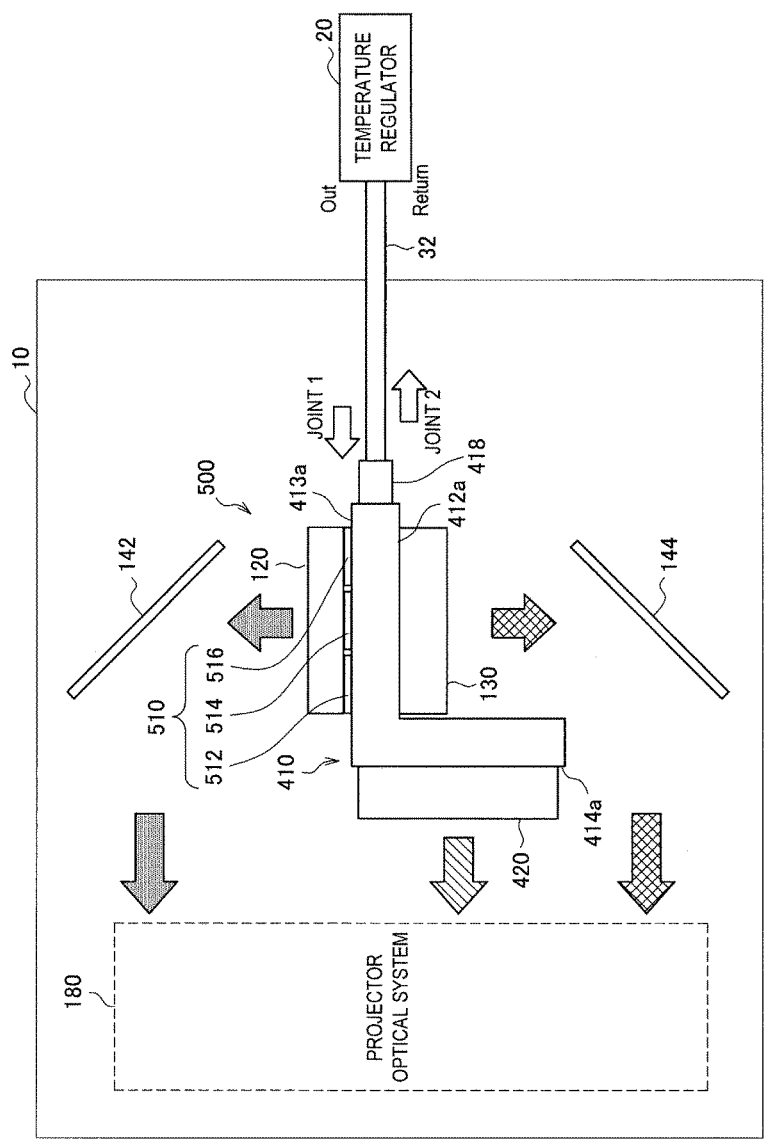
[Fig. 14]

[Fig. 15]
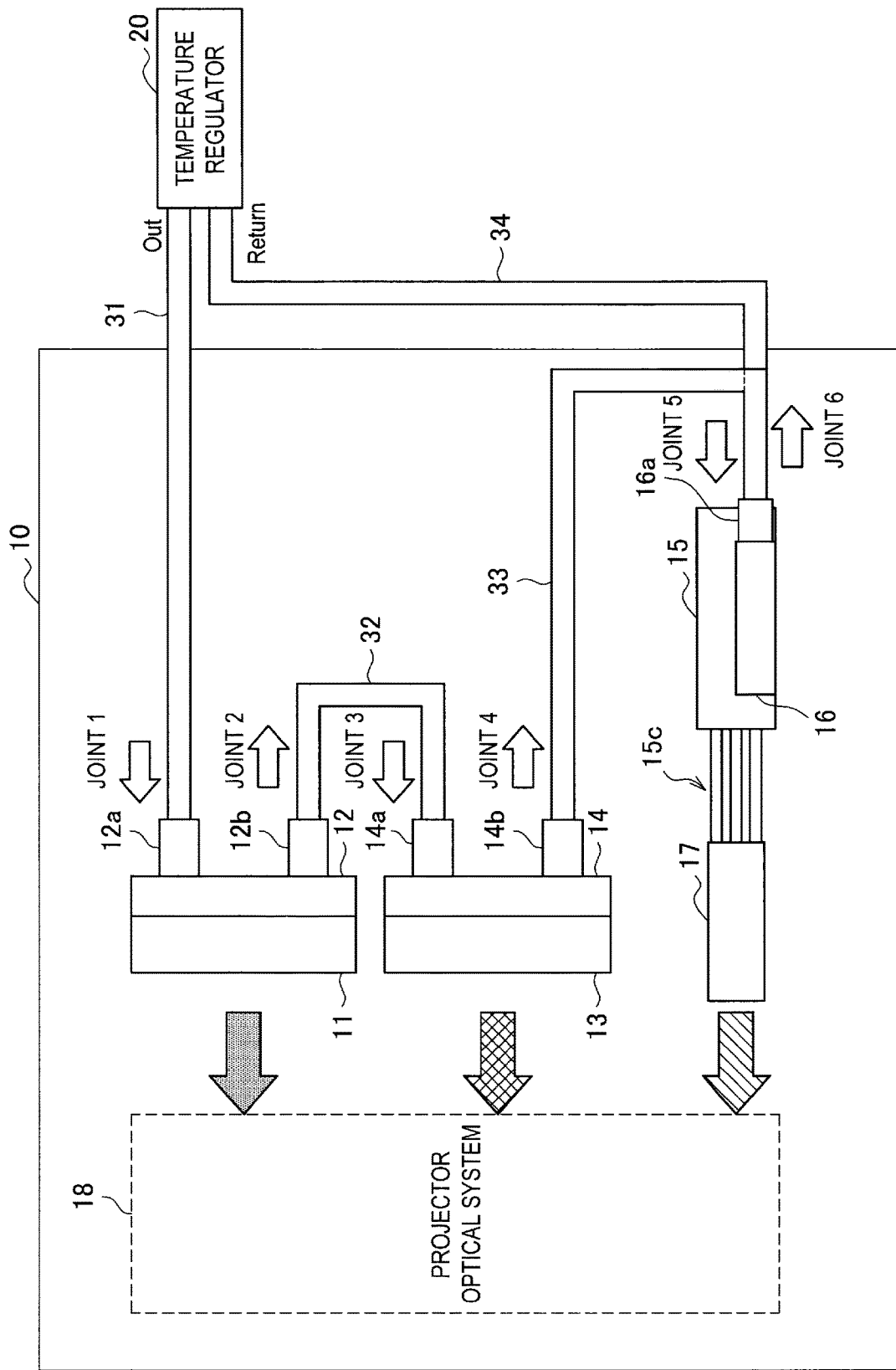

[Fig. 16]
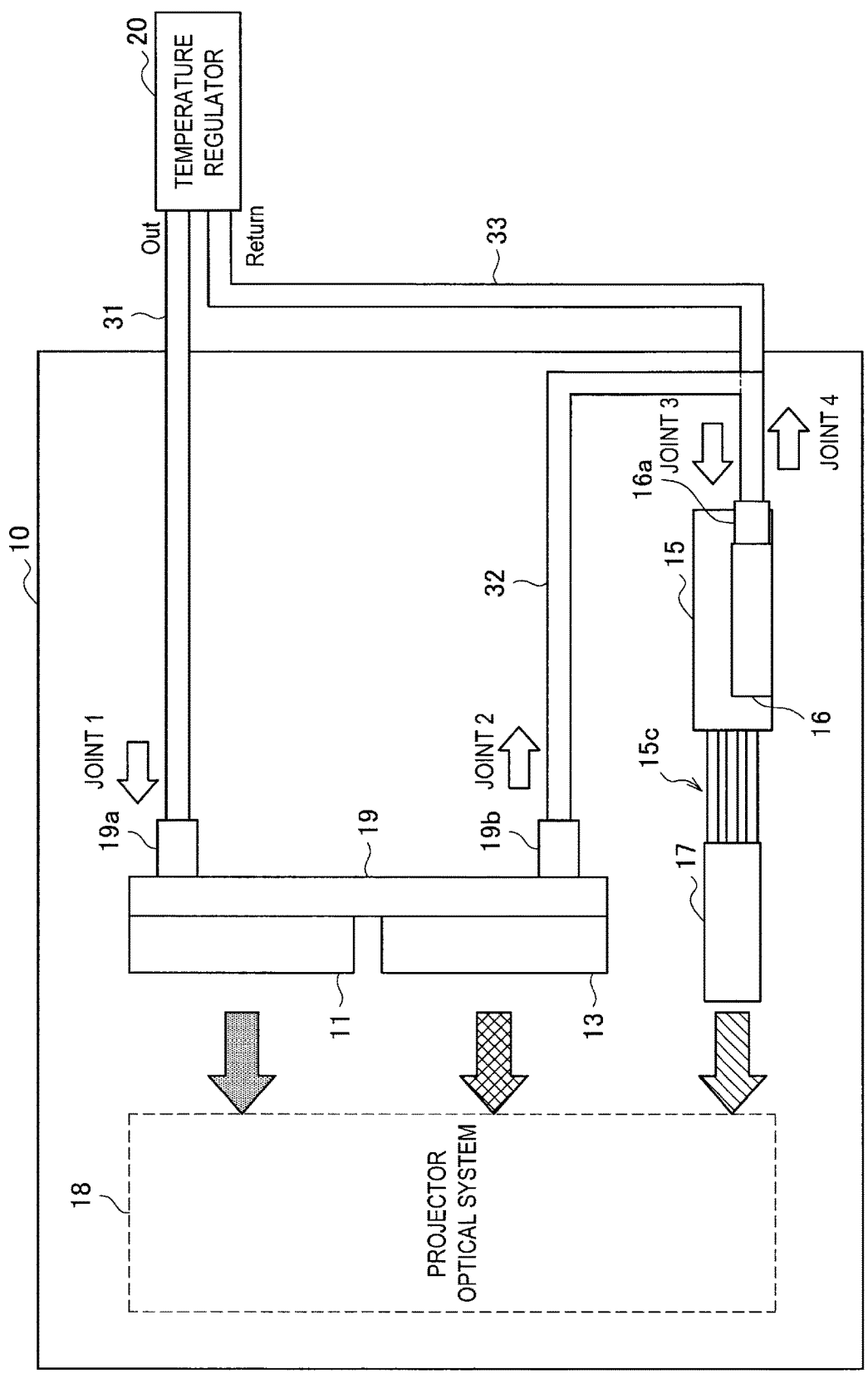

LIGHT SOURCE DEVICE AND IMAGE DISPLAY DEVICE

CROSS REFERENCE TO RELATED APPLICATIONS

This application claims the benefit of Japanese Priority Patent Application JP 2013-182234 filed Sep. 3, 2013, the entire contents of which are incorporated herein by reference.

TECHNICAL FIELD

The present disclosure relates to a light source device provided with a plurality of light sources and an image display device having the light source device.

BACKGROUND ART

A semiconductor laser that is a type of a solid-state light source is suitable for a light source for a projector because light emitted from a semiconductor laser has a high tendency to travel in straight lines and it has high color saturation in a high brightness condition. When a semiconductor laser is used as a light source for a projector, the temperature of the semiconductor laser rises, and thus it is necessary for the semiconductor laser to be maintained at a predetermined temperature to output light of a desired wavelength in a stable state. Accordingly, a semiconductor laser is cooled by circulating liquid coolant in a cooling jacket to be used as a cooling member for cooling the semiconductor laser, which is provided on the rear side of a semiconductor laser.

As an example, Patent Literature 1 discloses a configuration in which three light sources provided in a projection-type image display device are cooled by two cooling systems. The light sources are provided in different heat conduction units, and the heat generated by each light source is thermally conducted to coolant that flows through a coolant flow channel via the heat conduction unit.

CITATION LIST

Patent Literature

PTL 1: JP 2011-090310A

SUMMARY

Technical Problem

However, in the technique disclosed in Patent Literature 1, two light sources are cooled through one cooling system. For this reason, the number of cooling systems may be reduced, but it is difficult to reduce significantly the number of pipes used to connect each heat conduction unit provided with the light source to the cooling system, resulting in an increase of the size of the device.

FIG. 15 illustrates a schematic configuration of a projector 10 as an example of an image display device. As illustrated in FIG. 15, the projector 10 includes three light sources 11, 13, and 15 of red, blue, and green and a projector optical system 18 for causing light emitted from a light source to be displayed as an image on a screen or the like. An example of the red-color light source 11 and the blue-color light source 13 can include a semiconductor laser device. In addition, an example of the green-color light source 15 can include a laser light source using second harmonic generation (SHG). The light emitted from the light source 15 is directed to a fiber bundle portion 17 via an optical fiber 15c and then is incident on the projector optical system 18 from fiber bundle portion 17. The projector optical system 18 is configured to include, for example, a polarization beam splitter, a reflective liquid crystal panel, a projection optical system, and so on.

In this configuration, the light sources 11, 13, and 15 are provided with cooling jackets 12, 14, and 16, respectively, as a cooling member used to cool the light sources. The cooling jackets 12, 14, and 16 are provided with joint portions 12a, 14a, and 16a, respectively, which function as an inlet port for drawing the circulating fluid for cooling into the cooling jacket. The cooling jackets 12, 14, and 16 are also provided with joint portions 12b, 14b, and 16b, respectively, which function as an outlet port for discharging the circulating fluid for cooling. Note that the joint portion 16b is disposed in the backward direction of the joint portion 16a in FIG. 15, and therefore is not illustrated in FIG. 15. The joint portions 12a, 12b, 14a, 14b, 16a, and 16b are connected with hoses 31, 32, 33, and 34 that are used to circulate the circulating fluid between a temperature regulator 20 that maintains the circulating fluid at a predetermined temperature and the cooling jackets 12, 14, and 16.

If the light sources 11, 13, and 15 are cooled by the cooling jackets 12, 14, and 16, respectively, as shown in FIG. 15, then the number of joints is large and accordingly the number of hoses 31, 32, 33, and 34 is large. Thus, it is necessary to provide space for arranging the hoses 31, 32, 33, and 34. In addition, if the number or length of hoses 31, 32, 33, and 34 or the number of cooling jackets 12, 14, and 16 is large, then the pressure on the circulating fluid is increased and the flow rate of the circulating fluid is reduced, resulting in the decrease in cooling performance.

In order to reduce the number of cooling jackets and hoses, for example, as shown in FIG. 16, the configuration in which two light sources 11 and 13 are cooled by one cooling jacket 19 may be also considered. Although the number of joints is reduced by two, the size of the cooling jacket 19 is increased, resulting in the increase in weight.

Accordingly, it is desirable to reduce the size of a cooling member used to cool a light source and to simplify the configuration of the cooling member.

Solution to Problem

According to an embodiment of the present disclosure, there is provided a light source device including a plurality of solid-state light sources, and a cooling member having a plurality of cooling surfaces for cooling the plurality of solid-state light sources by using the single cooling member, the plurality of solid-state light sources being provided on the respective cooling surfaces.

According to an embodiment of the present disclosure, there is provided an image display device including a light source unit, an optical modulation and combining system configured to modulate and combine incident light, an illumination optical system configured to guide light emitted from the light source to the optical modulation and combining system, and a projection optical system configured to project an image emitted from the optical modulation and combining system. The light source unit includes a plurality of solid-state light sources, and a cooling member having a plurality of cooling surfaces for cooling the plurality of solid-state light sources by using the single cooling member, the plurality of solid-state light sources being provided on the respective cooling surfaces.

According to one or more embodiments of the present disclosure, a plurality of solid-state light sources are cooled by providing them on the respective cooling surfaces of one cooling member. A plurality of solid-state light sources can be cooled by one cooling member, and thus it is possible to reduce the number of pipes such as hoses used to draw and discharge the circulating fluid that is maintained at a predetermined temperature into and from the cooling member. In addition, by avoiding a plurality of solid-state light sources from being provided on the same surface, it is possible to reduce the size of the cooling member.

Advantageous Effects of Invention

According to one or more embodiments of the present disclosure as described above, it is possible to reduce the size of a cooling member used to cool a light source and to simplify the configuration of the cooling member.

BRIEF DESCRIPTION OF DRAWINGS

FIG. 1 is a schematic view illustrating an exemplary configuration of a projector including a semiconductor laser device according to a first embodiment of the present disclosure.

FIG. 2 is a perspective view illustrating the outer appearance of a first cooling jacket according to the first embodiment.

FIG. 3 is a perspective view illustrating the internal configuration of the first cooling jacket according to the first embodiment.

FIG. 4 is a sectional view taken along the line A-A of FIG. 3.

FIG. 5 is a perspective view illustrating an exemplary configuration of a CAN package array in which CAN packages are arranged.

FIG. 6 is a schematic view illustrating an exemplary configuration of a projector including a semiconductor laser device according to a second embodiment of the present disclosure.

FIG. 7 is a rear elevation illustrating the configuration of a cooling member according to the second embodiment.

FIG. 8 is a schematic view illustrating an exemplary configuration of a projector including a semiconductor laser device according to a third embodiment of the present disclosure.

FIG. 9 is a perspective view illustrating the outer appearance of a cooling jacket according to the third embodiment.

FIG. 10 is a perspective view illustrating the internal configuration of the cooling jacket according to the third embodiment.

FIG. 11 is a schematic view illustrating an exemplary configuration of a projector including a semiconductor laser device according to a fourth embodiment of the present disclosure.

FIG. 12 is a perspective view illustrating the outer appearance of a cooling jacket according to the fourth embodiment.

FIG. 13 is a perspective view illustrating the internal configuration of the cooling jacket according to the fourth embodiment.

FIG. 14 is a schematic view illustrating an exemplary configuration of a projector including a semiconductor laser device according to a fifth embodiment of the present disclosure.

FIG. 15 is a schematic view showing the configuration of a projector according to the related art of the present disclosure and illustrates an exemplary configuration for cooling three light sources by using different cooling members.

FIG. 16 is a schematic view showing the configuration of a projector according to the related art of the present disclosure and illustrates an exemplary configuration for cooling two of three light sources by using one cooling member.

DESCRIPTION OF EMBODIMENTS

It should be understood by those skilled in the art that various modifications, combinations, sub-combinations and alterations may occur depending on design requirements and other factors insofar as they are within the scope of the appended claims or the equivalents thereof.

The description will be made in the following order.
1. First Embodiment (rectangular parallelepiped cooling jacket)
 1.1. Schematic Configuration of Projector
 1.2. Configuration of Cooling Jacket
2. Second Embodiment (sharing of cooling jacket using heat pipe)
3. Third Embodiment (T-shaped cooling jacket)
 3.1. Schematic Configuration of Projector
 3.2. Configuration of Cooling Jacket
4. Fourth Embodiment (L-shaped cooling jacket)
 4.1. Schematic Configuration of Projector
 4.2. Configuration of Cooling Jacket
5. Fifth Embodiment (use of thermoelectric element)
<1. First Embodiment>
1.1. Schematic Configuration of Projector First, referring to FIG. 1, a schematic configuration of a projector 10 according to a first embodiment of the present disclosure will be described. FIG. 1 is a schematic view illustrating an exemplary configuration of the projector 10 including a semiconductor laser device 100 according to the present embodiment. The projector 10 according to the present embodiment includes three light sources 120, 130, and 150 of red, blue, and green and a projector optical system 180 that causes light emitted from a light source to be displayed as an image on a screen or the like.

An example of the red-color light source 120 and the blue-color light source 130 can include a semiconductor laser device. An example of the green-color light source 150 can include a laser light source using second harmonic generation. The light emitted from the light source 150 is directed to a fiber bundle portion 170 via an optical fiber 152 and then is incident on the projector optical system 180 from the fiber bundle portion 170.

The projector optical system 180 includes an optical modulation and combining system that modulates and combines the incident light, an illumination optical system that guides the light emitted from the light sources 120, 130, and 150 to the optical modulation and combining system, and a projection optical system that projects an image emitted from the optical modulation and combining system. The projector optical system 180 can employ Digital Light Processing (DLP) technology that uses a micro-mirror reflective panel, Liquid Crystal Display (LCD) technology that uses a transmissive liquid crystal panel, and Liquid Crystal on Silicon (LCOS) technology that uses a reflective liquid crystal panel.

The display panel technology to be used in the projector 10 according to an embodiment of the present disclosure is not limited to the above-described technology. In addition, a typical configuration of the above-described display panel technology can be applied to the projector optical system 180. Thus, the detailed description of the projector optical system 180 will be omitted herein.

The light sources 120, 130, and 150 are cooled by cooling jackets 110 and 160 that are used as a cooling member and the light sources are maintained at a temperature within a predetermined temperature range. As shown in FIG. 1, the light sources 120 and 130 are provided on the opposite surfaces of the first cooling jacket 110, and thus two light sources 120 and 130 are cooled by a single cooling member. A module composed of the first cooling jacket 110 and the light sources 120 and 130 is referred to as the semiconductor laser device 100.

In the configuration shown in FIG. 1, the direction of travel of each of light beams emitted from the light sources 120 and 130 is approximately orthogonal to the incident direction of light incident on the projector optical system 180. Thus, the light beams emitted from the light sources 120 and 130 are respectively totally reflected by total reflection mirrors 142 and 144 and the direction of travel of light beams is changed, and then each light beam is incident on the projector optical system 180. The semiconductor laser device 100 may be configured to include the total reflection minors 142 and 144.

The light source 150 is provided in the second cooling jacket 160. The light source 150 is provided in contact with the second cooling jacket 160 and is maintained at a predetermined temperature.

The circulating fluid that is adjusted to a predetermined temperature by a temperature regulator 20 is circulated in the first and second cooling jackets 110 and 160. An example of the temperature regulator 20 may include a thermo-chiller used to circulate circulating fluid with a pump while managing the temperature of the fluid. An example of the circulating fluid may include water. Alternatively, another example of the temperature regulator 20 may include a cooling unit composed of a circulating fluid pump, a reservoir tank, a radiator, a forced air-cooling fan for radiator, or the like. The cooling unit operates to cool using the outside air wind, and thus when the cooling unit is used as the temperature regulator 20, the first and second cooling jacket 110 and 160 will not be cooled below the outside air temperature.

The circulating fluid discharged from the temperature regulator 20 flows into the first cooling jacket 110 through an inlet port via a hose 31 and is circulated in the first cooling jacket 110, and then it is discharged from an outlet port of the first cooling jacket 110. The circulating fluid discharged from the outlet port of the first cooling jacket 110 flows into the second cooling jacket 160 through an inlet port of the second cooling jacket 160 via a hose 32 and is circulated in the second cooling jacket 160, and then it is discharged from an outlet port of the second cooling jacket 160. The circulating fluid discharged from the outlet port of the second cooling jacket 160 returns to the temperature regulator 20 via a hose 33.

1.2. Configuration of Cooling Jacket

The configuration of the cooling jacket according to the present embodiment will be described with reference to FIGS. 2 to 4. FIG. 2 is a perspective view illustrating the outer appearance of the first cooling jacket 110 according to the present embodiment. FIG. 3 is a perspective view illustrating the internal configuration of the first cooling jacket 110 according to the present embodiment. FIG. 4 is a sectional view taken along the line A-A of FIG. 3. In the present embodiment, the first cooling jacket 110 and the second cooling jacket 160 are assumed to have the same configuration. Thus, only the configuration of the first cooling jacket 110 will be described in detail.

The first cooling jacket 110 is configured to include a main body 111 and joint portions 116 and 118, as shown in FIGS. 2 and 3. The main body 111 has a flow channel 115 formed to allow the circulating fluid to flow therein. The joint portion 116 has one end connected to the flow channel 115 of the main body 111 and the other end connected to the hose 31, and the joint portion 118 has one end connected to the flow channel 115 of the main body 111 and the other end connected to the hose 32.

The main body 111 is a member having two cooling surfaces on which the light sources 120 and 130 are respectively provided and is made of metal having high thermal conductivity, such as copper or aluminum. When the cooling jacket uses copper as its material, if the flow velocity of the circulating fluid increases or the number of bubbles increases, then the cooling jacket may be corroded due to erosion-corrosion. In addition, when the cooling jacket uses aluminum as its material, if water is used as the circulating fluid, then a portion where the cooling jacket is in contact with the circulating fluid will be rusted. Thus, when water is used as the circulating fluid, it is necessary to apply a rust prevention treatment to the inside of the flow channel of the cooling jacket made of aluminum. Alternatively, when a cooling jacket made of aluminum is used, it is necessary to use an antifreezing solution that contains a rust preventive component as the circulating fluid. When corrosion resistance is regarded as important, a stainless material having thermal conductivity lower than that of copper or aluminum may be selected as the material of the cooling jacket.

The main body 111 is configured to include a flow channel forming portion 112 having the flow channel 115 formed therein and a cover portion 114 that covers an opening of the flow channel 115 formed in the flow channel forming portion 112.

The flow channel 115 is arranged in the flow channel forming portion 112 so that the entire cooling surface of the flow channel forming portion 112 is cooled with the circulating fluid, for example, as shown in FIG. 3. The flow channel 115 may be formed, for example, by shaving off one surface of a rectangular metal member. The flow channel 115 may be formed to cover the entire cooling surface so that the light sources 120 and 130 provided on the cooling surfaces of the main body 111 can be cooled efficiently, and, for example, it may be formed in a zigzag shape as shown in FIG. 3. In this case, an inlet side of the flow channel 115 communicating with the joint portion 116 and an outlet side of the flow channel 115 communicating with the joint portion 118 can be provided to be flush with each other, and thus it is possible to arrange the hoses efficiently.

The cover portion 114 is a plate-like member that covers the surface to which the flow channel 115 of the flow channel forming portion 112 opens. The cover portion 114 is sealed by brazing or the like and is fixed to the flow channel forming portion 112 to prevent the circulating fluid from leaking from the flow channel 115. In this way, it is possible to form the flow channel 115 easily by forming the main body 111 so that the flow channel 115 is formed in the flow channel forming portion 112 and then is covered with the cover portion 114.

The joint portions 116 and 118 are hollow members that connect the flow channel 115 formed in the flow channel forming portion 112 with the hoses 31 and 32. The joint portion 116 is connected to one end of the flow channel 115 that is an inlet port of the circulating fluid. The joint portion 118 is connected to the other end of the flow channel 115 that is an outlet port of the circulating fluid.

In the first cooling jacket 110, as shown in FIG. 4, the light source 120 is provided on a surface (hereinafter referred sometimes to as "first cooling surface") 114a of the main body 111 at the side of the cover portion 114. The light source 120 is configured to include, for example, semiconductor laser chip arrays 122a and 122b in which a plurality of semiconductor laser elements are arranged. The semiconductor laser chip array 122a is fixed to the first cooling surface 114a with screws 124a and 124b, and the semiconductor laser chip array 122b is fixed to the first cooling surface 114a with screws 124c and 124d.

On the other hand, the light source 130 is provided on a surface (hereinafter referred sometimes to as "second cooling surface") 112a of the first cooling jacket 110 at the side of the flow channel forming portion 112. The light source 130 is configured to include, for example, semiconductor laser chip arrays 132a and 132b in which a plurality of semiconductor laser elements are arranged, similar to that of the light source 120. The semiconductor laser chip array 132a is fixed to the second cooling surface 112a with screws 134a and 134b, and the semiconductor laser chip array 132b is fixed to the second cooling surface 112a with screws 134c and 134d.

In this way, the light sources 120 and 130 are directly fixed to the first cooling jacket 110, and thus thermal resistance between the members decreases, thereby improving cooling efficiency. In addition, it is not necessary to provide an additional member between the first cooling jacket 110 and the light sources 120 and 130, and thus the reduction in weight of the semiconductor laser device 100 can be achieved.

In the present embodiment, the light source 120 is configured to include two semiconductor laser chip arrays 122a and 122b, and the light source 130 is configured to include two semiconductor laser chip arrays 132a and 132b. However, an embodiment of the present disclosure is not limited to this example, that is, the light source may be configured to include one or more semiconductor laser chip arrays. In addition, a method for fixing the semiconductor laser chip arrays 122a and 122b to the cooling surface 114a and a method for fixing the semiconductor laser chip arrays 132a, and 132b to the cooling surface 112a are not limited to the use of a screw, and may employ any other methods of fixation.

Furthermore, a CAN package array in which CAN packages formed by storing semiconductor elements in a cylindrical metal case are arranged is used as a light source, instead of the semiconductor laser chip arrays 122a, 122b, 132a, and 132b. For example, the red-color light source may be composed of a semiconductor laser array, and the green-color and blue-color light sources may be composed of a CAN package array.

An exemplary configuration of the CAN package array in which CAN packages are arranged is illustrated in FIG. 5. The CAN package array 126 shown in FIG. 5 is configured to include a plurality of CAN packages 127, a holder 128, and a fixing member 129. The CAN package 127 arranged in a row on the holder 128 is fixed by being pinched from above by the fixing member 129. The fixing member 129 has a plurality of openings 129a that is formed to expose a light emitting portion of the CAN package 127 arranged on the holder 128. When the CAN package array 126 is manufactured, the use of a positioning member of the CAN package 127 to the holder 128 makes it possible to manufacture the CAN package array 126 with high accuracy and ease. Such CAN package array 126 may be used as the light source according to the present embodiment.

The light sources 120 and 130 are provided near the flow channel 115 so that they can be efficiently cooled with the circulating fluid flowing through the flow channel 115. For example, as shown in FIG. 4, approximately the half of the flow channel 115 is located in the region where the semiconductor laser chip arrays 122a and 132a are arranged to be opposed to each other, and the rest of the flow channel 115 is located in the region where the semiconductor laser chip arrays 122b and 132b are arranged to be opposed to each other. This makes it possible to cool the semiconductor laser chip arrays 122a, 122b, 132a, and 132b in a substantially uniform manner.

The projector 10 including the semiconductor laser device 100 according to the first embodiment has been described above. In accordance with such semiconductor laser device 100, the light sources 120 and 130 are provided on different surfaces of the first cooling jacket 110, and thus the size of the water-cooling jacket 110 can be reduced, for example, as compared with the configuration shown in FIG. 16. In particular, in accordance with the present embodiment of the present disclosure, the opposite surfaces of the first cooling jacket 110 become the cooling surfaces 112a and 114a, and thus it is possible to cool efficiently the light sources 120 and 130 in a substantially uniform manner.

<2. Second Embodiment>

Next, the configuration of a projector 10 including a semiconductor laser device 200 according to a second embodiment will be described with reference to FIGS. 6 and 7. FIG. 6 is a schematic view illustrating an exemplary configuration of the projector 10 including the semiconductor laser device 200 according to the second embodiment of the present disclosure. FIG. 7 is a rear elevation illustrating the configuration of a cooling member according to the present embodiment. The semiconductor laser device 200 according to the present embodiment is different from the semiconductor laser device 100 according to the first embodiment in that a cooling member used to cool two light sources 120 and 130 is configured to include a cooling jacket 110, a heat dissipation plate 210, and a heat receiving plate 220. Hereinafter, members that have substantially the same configuration as those of the projector 10 according to the first embodiment are denoted with the same reference numerals, and detailed explanation of these members is omitted.

The projector 10 according to the present embodiment is configured to include three light sources 120, 130, and 150 of red, blue, and green and a projector optical system 180 that causes light emitted from a light source to be displayed as an image on a screen or the like. They may be configured in a manner similar to those of the first embodiment.

The light sources 120, 130, and 150 are cooled by the cooling jackets 110 and 160 that act as a cooling member and the light sources are maintained at a temperature within a predetermined temperature range. The second cooling jacket 160 used to cool the light source 150 may be configured in a manner similar to that of the first embodiment.

The light sources 120 and 130 are cooled by the first cooling jacket 110. The first cooling jacket 110 may be also configured in a manner similar to the first cooling jacket 110 according to the first embodiment shown in FIGS. 2 and 3.

In the first cooling jacket 110 according to the present embodiment, as shown in FIG. 6, the light source 120 is provided on a surface (hereinafter referred to as "cooling surface") of the first cooling jacket 110 which faces the projector optical system 180, and the heat dissipation plate 210 is provided on the surface of the first cooling jacket 110 opposed to the cooling surface. The heat dissipation plate 210 is connected to the heat receiving plate 220 via a heat pipe 230 as shown in FIGS. 6 and 7. The heat receiving plate 220 is provided with the light source 130 at a surface of the heat receiving plate 220 which faces the projector optical system 180.

In other words, the light source 120 and the heat dissipation plate 210 are both cooled with the circulating fluid that circulates in the first cooling jacket 110. On the other hand, the heat receiving plate 220 absorbs heat from the light source 130 and transfers the absorbed heat via the heat pipe 230 to the heat dissipation plate 210 that has cooled. In this way, the light source 130 is provided on the heat receiving plate 220 to absorb heat from the light source 130 efficiently and the absorbed heat is transferred to the heat dissipation plate 210 via the heat pipe 230. Accordingly, it is possible to cool even the light source 130 that is not provided directly on the cooling jacket.

With such a configuration, the cooling surface of the first cooling jacket and the surface of the heat receiving plate 220 on which the light source is provided can be arranged to face the projector optical system 180. In other words, the light emitted from the light sources 120 and 130 can be incident on the projector optical system 180 directly without using a total reflection mirror or the like.

The heat pipe 230 may be composed of five heat pipes 231, 232, 233, 234, and 235 that are arranged along the direction in which the heat dissipation plate 210 and the heat receiving plate 220 are arranged, as shown in FIG. 7. In this case, between the heat dissipation plate 210 and the heat receiving plate 220, the heat pipe 230 can be provided at a position corresponding to the position at which the light sources 120 and 130 are provided, and thus it is possible to release heat from the light sources 120 and 130 in a more efficient manner. The number of the heat pipes 230 is not limited to the example shown in FIG. 7, and one or more heat pipes 230 may be provided. In addition, the way of providing the heat pipe 230 is not limited to the example shown in FIG. 7, and it can be appropriately changed.

The circulating fluid, which is adjusted to a predetermined temperature by the temperature regulator 20, is circulated in the first cooling jacket 110 and the second cooling jacket 160. The circulating fluid discharged from the temperature regulator 20 flows into the first cooling jacket 110 through an inlet port via the hose 31 and is circulated in the first cooling jacket 110, and then it is discharged from an outlet port of the first cooling jacket 110. The circulating fluid discharged from the outlet port of the first cooling jacket 110 flows into the second cooling jacket 160 through an inlet port of the second cooling jacket 160 via the hose 32 and is circulated in the second cooling jacket 160, and then it is discharged from an outlet port of the second cooling jacket 160. The circulating fluid discharged from the outlet port of the second cooling jacket 160 returns to the temperature regulator 20 via the hose 33.

The projector 10 including the semiconductor laser device 200 according to the present embodiment has been described above. In the semiconductor laser device 200 according to the present embodiment, the light source 120 is cooled through the cooling surface of the first cooling jacket 110 and the heat dissipation plate 210 is provided on the surface opposed to the cooling surface. The heat dissipation plate 210 is connected via the heat pipe 230 to the heat receiving plate 220 on which the light source 130 is provided. This makes it possible to cool two light sources 120 and 130 using one cooling jacket, thereby reducing the size of the projector 10.

<3. Third Embodiment>

Next, the configuration of a projector 10 including a semiconductor laser device 300 according to a third embodiment will be described with reference to FIGS. 8 to 10. FIG. 8 is a schematic view illustrating an exemplary configuration of the projector 10 including the semiconductor laser device 300 according to the third embodiment of the present disclosure. FIG. 9 is a perspective view illustrating the outer appearance of a cooling jacket 310 according to the present embodiment. FIG. 10 is a perspective view illustrating the internal configuration of the cooling jacket 310 according to the present embodiment.

The semiconductor laser device 300 according to the present embodiment is different from the semiconductor laser device 100 according to the first embodiment in that three light sources 120, 130, and 320 are cooled by one cooling jacket 310. Hereinafter, members that have substantially the same configuration as those of the projector 10 according to the first embodiment are denoted with the same reference numerals, and detailed explanation of these members is omitted.

3.1. Schematic Configuration of Projector

The projector 10 according to the present embodiment includes three light sources 120, 130, and 320 of red, blue, and green and a projector optical system 180 that causes light emitted from a light source to be displayed as an image on a screen or the like. In the present embodiment, three light sources 120, 130, and 320 are all made of a solid-state light source such as a semiconductor laser element.

The projector optical system 180 includes an optical modulation and combining system that modulates and combines the incident light, an illumination optical system that guides light beams emitted from the light sources 120, 130, and 320 to the optical modulation and combining system, and a projection optical system that projects an image emitted from the optical modulation and combining system. The projector optical system 180 may be configured in a manner similar to that of the first embodiment.

The light sources 120, 130, and 320 are cooled by the cooling jacket 310 that is one cooling member formed in a substantially T-shape when viewed from the side and they are maintained at a temperature within a predetermined temperature range. As shown in FIG. 8, the light sources 120 and 130 are provided on a first member (a member composed of "first flow channel forming portion 312A" and "cover portion 313" described later) of the cooling jacket 310 so that the light sources 120 and 130 are opposite to each other. In addition, the light source 320 is provided on a second member (a member composed of "second flow channel forming portion 312B" and "cover portion 314" described later) of the cooling jacket 310 so that the light source 320 may face the projector optical system 180. A module composed of the cooling jacket 310 and the light sources 120, 130, and 320 is referred to as the semiconductor laser device 300.

In the configuration shown in FIG. 8, the direction of travel of each of light beams emitted from the light sources 120 and 130 is approximately orthogonal to the incident direction of light incident on the projector optical system 180. Thus, the light beams emitted from the light sources 120 and 130 are respectively totally reflected by total reflection mirrors 142 and 144 and the direction of travel of light beams is changed, and then each light beam is incident on the projector optical system 180. The semiconductor laser device 300 may be configured to include the total reflection mirrors 142 and 144.

The light sources 120, 130, and 320 are cooled by the cooling jacket 310 and are maintained at a temperature within a predetermined temperature range. The circulating fluid, which is adjusted to a predetermined temperature by a temperature regulator 20, is circulated in the cooling jacket 310. The circulating fluid discharged from the temperature regulator 20 flows into the cooling jacket 310 through an inlet port via a hose 31 and is circulated in the cooling jacket 310, and then it is discharged from an outlet port of the cooling jacket 310. Note that the hose 31 is disposed in the backward direction of the hose 30 in FIG. 8, and therefore is not illustrated in FIG. 8. The circulating fluid discharged from the outlet port of the cooling jacket 310 returns to the temperature regulator 20 via a hose 32.

3.2. Configuration of Cooling Jacket

The cooling jacket 310 is configured to include a main body 311 and joint portions 316 and 318, as shown in FIGS. 9 and 10. The main body 311 has a flow channel 315 formed to allow the circulating fluid to flow therein. Each of the joint portions 316 and 318 has one end connected to the flow channel 315 and the other end connected to a hose.

The main body 311 is a member having three cooling surfaces on which the light sources 120, 130, and 320 are provided and is made of metal having high thermal conductivity, such as copper or aluminum. The main body 311 is configured to include a flow channel forming portion 312 having the flow channel 315 formed therein and include cover portions 313 and 314 that cover an opening of the flow channel 315 formed in the flow channel forming portion 312.

The flow channel forming portion 312 is configured to include the first flow channel forming portion 312A and the second flow channel forming portion 312B. The first flow channel forming portion 312A is connected with the joint portions 316 and 318, and the second flow channel forming portion 312B is provided so that it may be orthogonal to the first flow channel forming portion 312A. A surface of the first flow channel forming portion 312A opposed to a surface to which the joint portions 316 and 318 are joined is connected to a central portion of a surface of the second flow channel forming portion 312B opposed to a surface on which the light source 320 is provided. In other words, as shown in FIG. 9, the main body 311 is formed in a substantially T-shape when viewed from the side. The first cover portion 313 is provided on the first flow channel forming portion 312A, and the second cover portion 314 is provided on the second flow channel forming portion 312B.

The flow channel 315 is arranged in the flow channel forming portion 312 so that the circulating fluid is circulated throughout the inside of the flow channel forming portion 312, for example, as shown in FIG. 10. The flow channel 315 may be formed, for example, by shaving off one surface of a rectangular metal member in a manner similar as the flow channel 115 formed in the flow channel forming portion 112 according to the first embodiment. It is preferable that the flow channel 315 is arranged to cover the entire cooling surface so that the light sources 120, 130, and 320 provided on the cooling surface of the main body 311 can be cooled efficiently. The flow channel 315 may be formed to meander inside the flow channel forming portion 312, for example, as shown in FIG. 10. In this case, an inlet side of the flow channel 315 communicating with the joint portion 316 and an outlet side of the flow channel 315 communicating with the joint portion 318 are provided to be flush with each other, and thus it is possible to arrange the hoses efficiently.

The cover portions 313 and 314 are plate-like members that cover the surface to which the flow channel 315 of the flow channel forming portion 312 opens. The cover portions 313 and 314 are fixed to the flow channel forming portion 312 to prevent the circulating fluid from leaking from the flow channel 315.

The joint portions 316 and 318 are hollow members that connect the flow channel 315 formed in the flow channel forming portion 312 with the hoses 31 and 32, respectively. The joint portion 316 is connected to one end of the flow channel 315 that is an inlet port of the circulating fluid. The joint portion 318 is connected to the other end of the flow channel 315 that is an outlet port of the circulating fluid.

As shown in FIG. 8, the light source 120 is provided on a surface (hereinafter referred sometimes to as "first cooling surface") 313a of the main body 311 at the side of the first cover portion 313. The light source 130 is provided on a surface (hereinafter referred sometimes to as "second cooling surface") 312a of the cooling jacket 310 at the side of the first flow channel forming portion 312A. The light source 320 is provided on a surface (hereinafter referred sometimes to as "third cooling surface") 314a of the cooling jacket 310 at the side of the second flow channel forming portion 312B.

The light sources 120, 130, and 320 can be configured to include, for example, one or more semiconductor laser chip arrays in which a plurality of semiconductor laser elements are arranged in a manner similar to the first embodiment. The semiconductor laser chip arrays that constitute the light sources 120, 130, and 320 are fixed to the respective first, second, and third cooling surfaces 313a, 312a, and 314a by using a fixed member such as a screw or the like.

In this way, the light sources 120, 130, and 320 are directly fixed to the cooling jacket 310, and thus thermal resistance between the members decreases, thereby improving cooling efficiency. In addition, it is not necessary to provide an additional member between the cooling jacket 310 and the light sources 120, 130, and 320, and thus the reduction in weight of the semiconductor laser device 300 can be achieved.

The projector 10 including the semiconductor laser device 300 according to the present embodiment has been described above. In the semiconductor laser device 300 according to the present embodiment, the light sources 120, 130, and 320 are provided on different surfaces of the cooling jacket 310, and thus the size of the water-cooling jacket 310 can be reduced, for example, as compared with the configuration shown in FIG. 16. In addition, the circulating fluid that is circulated between the temperature regulator 20 and the cooling jacket 310 can be transferred through two hoses 31 and 32, and thus it is not necessary to provide a space or the like to arrange the hoses 31 and 32. Furthermore, in accordance with the present embodiment, the light sources 120, 130, and 320 are all cooled by one cooling jacket 310, and thus it is possible to cool efficiently the light sources 120, 130, and 320 in a substantially uniform manner.

<4. Fourth Embodiment>

Next, the configuration of a projector 10 including a semiconductor laser device 400 according to a fourth embodiment will be described with reference to FIGS. 11 to 13. FIG. 11 is a schematic view illustrating an exemplary configuration of the projector 10 including the semiconductor laser device 400 according to the fourth embodiment of the present disclosure. FIG. 12 is a perspective view illustrating the outer appearance of a cooling jacket 410 according to the present embodiment. FIG. 13 is a perspective view illustrating the internal configuration of the cooling jacket 410 according to the present embodiment.

The semiconductor laser device 400 according to the present embodiment is different from the semiconductor laser device 300 according to the third embodiment in that the cooling jacket has a substantially L-shape. Hereinafter, members that have substantially the same configuration as those of the projector 10 according to the third embodiment are denoted with the same reference numerals, and detailed explanation of these members is omitted.

4.1. Schematic Configuration of Projector

The projector 10 according to the present embodiment includes three light sources 120, 130, and 420 of red, blue, and green and a projector optical system 180 that causes light emitted from a light source to be displayed as an image on a screen or the like. In the present embodiment, the three light sources 120, 130, and 420 are all made of a solid-state light source such as a semiconductor laser element.

The projector optical system 180 includes an optical modulation and combining system that modulates and combines the incident light, an illumination optical system that guides the light emitted from the light sources 120, 130, and 420 to the optical modulation and combining system, and a projection optical system that projects an image emitted from the optical modulation and combining system. The projector optical system 180 may be configured in a manner similar to that of the first embodiment.

The light sources 120, 130, and 420 are cooled by the cooling jacket 410 that is one cooling member formed in a substantially L-shape when viewed from the side and they are maintained at a temperature within a predetermined temperature range. As shown in FIG. 11, the light sources 120 and 130 are provided on a first member (a member composed of "first flow channel forming portion 412A" and "cover portion 413" described later) of the cooling jacket 410 so that the light sources 120 and 130 are opposite to each other. In addition, the light source 420 is provided on a second member (a member composed of "second flow channel forming portion 412B" and "cover portion 414" described later) of the cooling jacket 410 so that the light source 420 faces the projector optical system 180. A module composed of the cooling jacket 410 and the light sources 120, 130, and 420 is referred to as the semiconductor laser device 400.

In the configuration shown in FIG. 11, the direction of travel of each of light beams emitted from the light sources 120 and 130 is approximately orthogonal to the incident direction of light incident on the projector optical system 180. Thus, in accordance with the present embodiment, the light beams emitted from the light sources 120 and 130 are respectively totally reflected by total reflection mirrors 142 and 144 and the direction of travel of light beams is changed, and then each light beam is incident on the projector optical system 180, similar to that of the third embodiment. The semiconductor laser device 400 may be configured to include the total reflection mirrors 142 and 144.

The light sources 120, 130, and 420 are cooled by the cooling jacket 410 and are maintained at a temperature within a predetermined temperature range. The circulating fluid adjusted to a predetermined temperature by a temperature regulator 20 is circulated in the cooling jacket 410. The circulating fluid discharged from the temperature regulator 20 flows into the cooling jacket 410 through an inlet port via a hose 31 and is circulated in the cooling jacket 410, and then it is discharged from an outlet port. The circulating fluid discharged from the outlet port of the cooling jacket 410 returns to the temperature regulator 20 via a hose 32.

4.2. Configuration of Cooling Jacket

The cooling jacket 410 is configured to include a main body 411 and joint portions 416 and 418, as shown in FIGS. 12 and 13. The main body 411 has a flow channel 415 formed to allow the circulating fluid to flow therein. Each of the joint portions 416 and 418 has one end connected to the flow channel 415 and the other end connected to a hose.

The main body 411 is a member having three cooling surfaces on which the light sources 120, 130, and 420 are provided and is made of metal having high thermal conductivity, such as copper or aluminum. The main body 411 is configured to include a flow channel forming portion 412 having the flow channel 415 formed therein and include cover portions 413 and 414 that cover an opening of the flow channel 415 formed in the flow channel forming portion 412.

The flow channel forming portion 412 is configured to include the first flow channel forming portion 412A and the second flow channel forming portion 412B. The first flow channel forming portion 412A is connected with the joint portions 416 and 418, and the second flow channel forming portion 412B is provided so that it may be orthogonal to the first flow channel forming portion 412A. A surface of the first flow channel forming portion 412A opposed to a surface to which the joint portions 416 and 418 are joined is connected to one end side of a surface of the second flow channel forming portion 412B opposed to a surface on which the light source 420 is provided. In other words, as shown in FIG. 12, the main body 411 is formed in a substantially L-shape when viewed from the side. The first cover portion 413 is provided on the first flow channel forming portion 412A, and the second cover portion 414 is provided on the second flow channel forming portion 412B.

The flow channel 415 is arranged in the flow channel forming portion 412 so that the circulating fluid is circulated throughout the inside of the flow channel forming portion 412, for example, as shown in FIG. 13. The flow channel 415 may be formed, for example, by shaving off one surface of a rectangular metal member. It is preferable that the flow channel 415 is arranged to cover the entire cooling surface so that the light sources 120, 130, and 420 provided on the cooling surface of the main body 411 can be cooled efficiently. The flow channel 415 may be arranged to meander while going back and forth inside the first and second flow channel forming portions 412A and 412B, for example, as shown in FIG. 13. In this case, an inlet side of the flow channel 415 communicating with the joint portion 416 and an outlet side of the flow channel 415 communicating with the joint portion 418 are provided to be flush with each other, and thus it is possible to arrange the hoses efficiently.

The cover portions 413 and 414 are plate-like members that cover the surface to which the flow channel 415 of the flow channel forming portion 412 opens. The cover portions 413 and 414 are fixed to the flow channel forming portion 412 to prevent the circulating fluid from leaking from the flow channel 415.

The joint portions 416 and 418 are hollow members that connect the flow channel 415 formed in the flow channel forming portion 412 with the hoses 31 and 32, respectively. The joint portion 416 is connected to one end of the flow channel 415 that is an inlet port of the circulating fluid. The joint portion 418 is connected to the other end of the flow channel 415 that is an outlet port of the circulating fluid.

As shown in FIG. 11, the light source 120 is provided on a surface (hereinafter referred sometimes to as "first cooling surface") 413a of the main body 411 at the side of the first cover portion 413. The light source 130 is provided on a surface (hereinafter referred sometimes to as "second cooling surface") 412a of the cooling jacket 410 at the side of the first flow channel forming portion 412A. The light source 420 is provided on a surface (hereinafter referred sometimes to as "third cooling surface") 414a of the cooling jacket 410 at the side of the second flow channel forming portion 412B.

The light sources 120, 130, and 420 can be configured to include, for example, one or more semiconductor laser chip arrays in which a plurality of semiconductor laser elements are arranged in a manner similar to the first embodiment. The semiconductor laser chip arrays that constitute the light sources 120, 130, and 420 are fixed to the first, second, and third cooling surfaces 413a, 412a, and 414a, respectively, by using a fixed member such as a screw or the like.

In this way, the light sources 120, 130, and 420 are directly fixed to the cooling jacket 410, and thus thermal resistance between the members decreases, thereby improving cooling efficiency. In addition, it is not necessary to provide an additional member between the cooling jacket 410 and the light sources 120, 130, and 420, and thus the reduction in weight of the semiconductor laser device 400 can be achieved.

The projector 10 including the semiconductor laser device 400 according to the present embodiment has been described above. In the semiconductor laser device 400 according to the present embodiment, the light sources 120, 130, and 420 are provided on different surfaces of the cooling jacket 410, and thus the size of the water-cooling jacket 410 can be reduced, for example, as compared with the configuration shown in FIG. 16. In addition, the circulating fluid that is circulated between the temperature regulator 20 and the cooling jacket 410 can be transferred through two hoses 31 and 32, and thus it is not necessary to provide a space or the like to arrange the hoses 31 and 32. Furthermore, in accordance with the present embodiment, the light sources 120, 130, and 420 are all cooled by one cooling jacket 410, and thus it is possible to cool efficiently the light sources 120, 130, and 420 in a substantially uniform manner.

The L-shaped cooling jacket 410 according to the present embodiment is easy to manufacture the flow channel 415 as compared with the T-shaped cooling jacket 310 according to the third embodiment. On the other hand, when the T-shaped cooling jacket 310 according to the third embodiment is used, it is possible for the light sources 120 and 130 to be provided not to protrude from the second flow channel forming portion 312B of the cooling jacket 310. Thus, when the cooling jacket 310 is used, the semiconductor laser device 300 can be formed compact as compared with the case using the L-shaped cooling jacket 410 according to the present embodiment.

<5. Fifth Embodiment>

Next, the configuration of a projector 10 including a semiconductor laser device 500 according to a fifth embodiment will be described with reference to FIG. 14. FIG. 14 is a schematic view illustrating an exemplary configuration of the projector 10 including the semiconductor laser device 500 according to the fifth embodiment of the present disclosure.

The semiconductor laser device 500 according to the present embodiment is different from the semiconductor laser device 400 according to the fourth embodiment in that a thermoelectric element 510 is provided between the first cooling surface 413a of the cooling jacket 410 and the light source 120. The configuration of the projector 10 according to the present embodiment is substantially the same as the projector 10 according to the fourth embodiment, and thus the detailed explanation is omitted. The following description will be mainly focused on the difference between the semiconductor laser device 500 and the semiconductor laser device 400 according to the fourth embodiment.

The thermoelectric element 510 provided between the first cooling surface 413a of the cooling jacket 410 and the red-color light source 120 functions to maintain the light source 120 at a more desirable temperature. The thermoelectric element 510 is composed of, for example, a Peltier element or the like. In the semiconductor laser device 500 according to the present embodiment, three thermoelectric elements 512, 514, and 516 are provided, for example, as shown in FIG. 14. The number of thermoelectric elements is not limited to this example, and one or more thermoelectric elements may be provided.

The red-color light source 120 in which the thermoelectric element 510 is provided has a greater magnitude of change in wavelength when the temperature changes by one ° C. as compared with the blue-color light source 130 or the green-color light source 420. Thus, in the semiconductor laser device 500 according to the present embodiment, the thermoelectric element 510 is provided in the red-color light source 120 having the wavelength that is susceptible to temperature change. However, the embodiment of the present disclosure is not limited to this example, and the thermoelectric element 510 may be provided between the cooling jacket 410 and other light sources 130 and 420. Alternatively, it is possible for the light sources 120, 130, and 420 to have substantially the same life by providing the thermoelectric element 510 to all of the light sources 120, 130, and 420.

The projector 10 including the semiconductor laser device 500 according to the present embodiment has been described above. In the semiconductor laser device 500 according to the present embodiment, the light sources 120, 130, and 420 are provided on different surfaces of the cooling jacket 410, and thus the size of the water-cooling jacket 410 can be reduced, for example, as compared with the configuration shown in FIG. 16. In addition, the circulating fluid that is circulated between the temperature regulator 20 and the cooling jacket 410 can be transferred through two hoses 31 and 32, and thus it is not necessary to provide a space or the like to arrange the hoses 31 and 32.

Furthermore, in accordance with the embodiment of the present disclosure, the light sources 120, 130, and 420 are all cooled by one cooling jacket 410, and thus it is possible to cool efficiently the light sources 120, 130, and 420 in a substantially uniform manner. In addition, by providing the thermoelectric element 510 between the cooling jacket 410 and at least one of the light sources 120, 130, and 420, it is possible to maintain the light source at a desired temperature with high accuracy.

Although preferred embodiments of the present disclosure are described in detail with reference to the accompanying drawings, the technical scope of the present disclosure is not limited to these exemplary embodiments. It should be understood by those skilled in the art that various modifications, combinations, sub-combinations and alterations may occur depending on design requirements and other factors insofar as they are within the scope of the appended claims or the equivalents thereof.

For example, although a semiconductor laser element is used as the light sources 120, 130, 320, and 420 in the above-described embodiment, an embodiment of the present disclosure is not limited thereto. As one example, the light sources 120, 130, 320, and 420 may be a solid-state light source such as LED.

Moreover, although the light source 120 is a red color, the light source 130 is a blue color, and the light source 150, 320, or 420 is a green color as described in the above embodiment, an embodiment of the present disclosure is not limited thereto. The color of the light source to be used in each of the above-described embodiments may be any color other than red, blue, or green. In addition, the position in which a light source of each color is arranged in a cooling member is not limited to the above-described exemplary embodiments, and the arrangement position of a light source is not dependent on the color of the light source.

Additionally, the present technology may also be configured as below.

(1) A light source device including:

a plurality of solid-state light sources; and a cooling member having a plurality of cooling surfaces, the cooling member being configured to cool the plurality of solid-state light sources provided on the respective cooling surfaces.

(2) The light source device according to (1), further including: a plurality of reflective members configured to cause light emitted from each of the solid-state light sources to be directed to travel in a same direction.

(3) The light source device according to (1) or (2), wherein the solid-state light source includes a first solid-state light source and a second solid-state light source, and wherein the first solid-state light source and the second solid-state light source are provided on the respective cooling surfaces facing each other.

(4) The light source device according to (3), wherein the solid-state light source further includes a third solid-state light source, wherein the cooling member is formed as a substantially T-shaped member including a first member having two cooling surfaces facing each other and a second member connected to the first member, the second member being orthogonal to each of the cooling surfaces of the first member, and wherein a surface opposite to a surface of the second member to which the first member is connected is to be a cooling surface of the second member, and the third solid-state light source is provided on the cooling surface of the second member.

(5) The light source device according to (3), wherein the solid-state light source further includes a third solid-state light source, wherein the cooling member is formed as a substantially L-shaped member including a first member having two cooling surfaces facing each other and a second member connected to the first member, the second member being orthogonal to each of the cooling surfaces of the first member, and wherein a surface opposite to a surface of the second member to which the first member is connected is to be a cooling surface of the second member, and the third solid-state light source is provided on the cooling surface of the second member.

(6) The light source device according to any one of (1) to (5), wherein the cooling member has a flow channel formed therein, the flow channel allowing a circulating fluid maintained at a predetermined temperature to be circulated.

(7) The light source device according to any one of (1) to (6), further including:

a thermoelectric element provided between at least one solid-state light source of the plurality of solid-state light sources and the cooling member.

(8) An image display device including:

a light source unit;

an optical modulation and combining system configured to modulate and combine incident light;

an illumination optical system configured to guide light emitted from the light source unit to the optical modulation and combining system; and a projection optical system configured to project an image emitted from the optical modulation and combining system, wherein the light source unit includes a plurality of solid-state light sources, and a cooling member having a plurality of cooling surfaces, the cooling member being configured to cool the plurality of solid-state light sources provided on the respective cooling surfaces.

(A1) A light source device comprising:

a plurality of solid-state light sources; and a cooling member, wherein the plurality of solid-state light sources is disposed, respectively, opposite a plurality of exterior surfaces of the cooling member, and the cooling member is configured to cool the plurality of solid-state light sources disposed opposite the respective plurality of exterior surfaces of the cooling member.

(A2) The light source device according to (A1), further comprising:

a plurality of reflective members configured to cause light emitted from the plurality of solid-state light sources to travel in a same direction.

(A3) The light source device according to (A1), wherein the plurality of solid-state light sources includes a first solid-state light source and a second solid-state light source, and wherein the first solid-state light source and the second solid-state light source are disposed opposite first and second of the plurality of exterior surfaces, respectively, and wherein the first and second exterior surfaces face in opposite directions.

(A4) The light source device according to (A3), wherein the plurality of solid-state light sources further includes a third solid-state light source, wherein the cooling member is formed as a substantially T-shaped member including a first member having the first and second exterior surfaces facing in opposite directions, and a second member connected to the first member, the second member including a third exterior surface orthogonal to the first and second exterior surfaces of the first member, and wherein the third exterior surface of the second member is disposed opposite to a surface of the second member to which the first member is connected, and wherein the third solid-state light source is disposed opposite to the third exterior surface of the second member.

(A5) The light source device according to (A3), wherein the plurality of solid-state light sources further includes a third solid-state light source, wherein the cooling member is formed as a substantially L-shaped member including a first member having the first and second exterior surfaces facing in opposite directions and a second member connected to the first member, the second member including a third exterior surface orthogonal to the first and second exterior surfaces of the first member, and wherein the third exterior surface of the second member is disposed opposite to a surface of the second member to which the first member is connected, and wherein the third solid-state light source is disposed opposite to the third exterior surface of the second member.

(A6) The light source device according to (A1), further comprising a flow channel formed in the cooling member, the flow channel configured to contain a circulating fluid maintained at a temperature.

(A7) The light source device according to (A6), wherein the fluid comprises a liquid.

(A8) The light source device according to (A7), wherein the liquid comprises water.

(A9) The light source device according to (A6), wherein the fluid comprises air.

(A10) The light source device according to (A1), further comprising:
a thermoelectric element provided between at least one solid-state light source of the plurality of solid-state light sources and the cooling member.

(A11) The light source device according to (A7), wherein the thermoelectric element comprises a Peltier element.

(A12) The light source device according to (A1), wherein the plurality of solid-state light sources comprises a plurality of lasers.

(A13) The light source device according to (A1), wherein the cooling member comprises metal.

(A14) The light source device according to (A13), wherein the metal has high thermal conductivity.

(A15) The light source device according to (A13), wherein the metal comprises copper or aluminum.

(A16) The light source device according to (A1), wherein the plurality of exterior surfaces of the cooling member includes a first exterior surface, wherein the plurality of solid-state light sources includes a first light solid-state source disposed opposite to the first exterior surface, and wherein a direction in which light is emitted by the first solid-state light source is orthogonal to the first exterior surface.

(A17) The light source device according to (A1), wherein the plurality of exterior surfaces of the cooling member includes a first exterior surface, wherein the plurality of solid-state light sources includes a first solid-state light source disposed opposite to the first exterior surface, and wherein the first solid-state light source is in contact with the first exterior surface.

(A18) The light source device according to (A1), wherein the cooling member comprises a cooling jacket.

(A19) An image display device comprising:
a light source unit;
an optical modulation and combining system configured to modulate and combine light
an illumination optical system configured to guide light emitted from the light source unit to the optical modulation and combining system; and
a projection optical system configured to project an image emitted from the optical modulation and combining system,
wherein the light source unit includes
a plurality of solid-state light sources, and
a cooling member, the plurality of solid-state light sources being disposed, respectively, opposite a plurality of exterior surfaces of the cooling member, the cooling member being configured to cool the plurality of solid-state light sources disposed opposite the respective plurality of exterior surfaces of the cooling member.

REFERENCE SIGNS LIST 10 projector
20 temperature regulator
31, 32, 33, 34 hose
100, 200, 300, 400, 500 semiconductor laser device
110, 160, 210, 310, 410 cooling jacket
111, 311, 411 main body
112, 312A, 312B, 412A, 412B flow channel forming portion
114, 313, 314, 413, 414 cover portion
115, 315, 415 flow channel
116, 118, 316, 318, 416, 418 joint portion
120, 130, 150, 320, 420 light source
142, 144 total reflection mirror
170 fiber bundle portion
180 projector optical system
210 heat dissipation plate
220 heat receiving plate
230 heat pipe
510, 512, 514, 516 thermoelectric element

The invention claimed is:

1. A light source device comprising:
a plurality of solid-state light sources; and
a cooling member,
wherein
the plurality of solid-state light sources are disposed, respectively, opposite a plurality of exterior surfaces of the cooling member, and the cooling member is configured to cool the plurality of solid-state light sources disposed opposite the respective plurality of exterior surfaces of the cooling member,
the plurality of solid-state light sources includes a first solid-state light source and a second solid-state light source,
the first solid-state light source and the second solid-state light source are disposed opposite first and second exterior surfaces of the plurality of exterior surfaces, respectively, and wherein the first and second exterior surfaces face in opposite directions,
the plurality of solid-state light sources further includes a third solid-state light source,
the cooling member is formed as a substantially T-shaped member including a first member having the first and second exterior surfaces facing in opposite directions, and a second member connected to the first member, the second member including a third exterior surface orthogonal to the first and second exterior surfaces of the first member,
the third exterior surface of the second member is disposed opposite to a surface of the second member to which the first member is connected, and
the third solid-state light source is disposed opposite to the third exterior surface of the second member.

2. The light source device according to claim 1, further comprising:
a plurality of reflective members configured to cause light emitted from the plurality of solid-state light sources to travel in a same direction.

3. The light source device according to claim 1, further comprising:
a flow channel formed in the cooling member, the flow channel being configured to contain a circulating fluid maintained at a temperature.

4. The light source device according to claim 3, wherein the fluid includes a liquid.

5. The light source device according to claim 4, wherein the liquid includes water.

6. The light source device according to claim 3, wherein the fluid includes air.

7. The light source device according to claim 4, wherein the thermoelectric element includes a Peltier element.

8. The light source device according to claim 1, further comprising:
a thermoelectric element provided between at least one solid-state light source of the plurality of solid-state light sources and the cooling member.

9. The light source device according to claim 1, wherein the plurality of solid-state light sources includes a plurality of lasers.

10. The light source device according to claim 1, wherein the cooling member includes metal.

11. The light source device according to claim 10, wherein the metal has high thermal conductivity.

12. The light source device according to claim 10, wherein the metal includes copper or aluminum.

13. The light source device according to claim 1, wherein a direction in which light is emitted by the first solid-state light source is orthogonal to the first exterior surface.

14. The light source device according to claim 1, wherein the first solid-state light source is in contact with the first exterior surface.

15. The light source device according to claim 1, wherein the cooling member includes a cooling jacket.

16. An image display device comprising:
a light source unit;
an optical modulation and combining system configured to modulate and combine light;
an illumination optical system configured to guide light emitted from the light source unit to the optical modulation and combining system; and
a projection optical system configured to project an image emitted from the optical modulation and combining system,
wherein the light source unit includes
a plurality of solid-state light sources,
a cooling member, the plurality of solid-state light sources being disposed, respectively, opposite a plurality of exterior surfaces of the cooling member, the cooling member being configured to cool the plurality of solid-state light sources disposed opposite the respective plurality of exterior surfaces of the cooling member,
the plurality of solid-state light sources includes a first solid-state light source and a second solid-state light source,
the first solid-state light source and the second solid-state light source are disposed opposite first and second exterior surfaces of the plurality of exterior surfaces, respectively, and wherein the first and second exterior surfaces face in opposite directions,
the plurality of solid-state light sources further includes a third solid-state light source
the cooling member is formed as a substantially T-shaped member including a first member having the first and second exterior surfaces facing in opposite directions, and a second member connected to the first member, the second member including a third exterior surface orthogonal to the first and second exterior surfaces of the first member,
the third exterior surface of the second member is disposed opposite to a surface of the second member to which the first member is connected, and
the third solid-state light source is disposed opposite to the third exterior surface of the second member.

17. A light source device comprising:
a plurality of solid-state light sources; and
a cooling member,
wherein
the plurality of solid-state light sources is disposed, respectively, opposite a plurality of exterior surfaces of the cooling member, and the cooling member is configured to cool the plurality of solid-state light sources disposed opposite the respective plurality of exterior surfaces of the cooling member,
the plurality of solid-state light sources includes a first solid-state light source and a second solid-state light source,
the first solid-state light source and the second solid-state light source are disposed opposite first and second exterior surfaces of the plurality of exterior surfaces, respectively, and wherein the first and second exterior surfaces face in opposite directions,
the plurality of solid-state light sources further includes a third solid-state light source,
the cooling member is formed as a substantially L-shaped member including a first member having the first and second exterior surfaces facing in opposite directions and a second member connected to the first member, the second member including a third exterior surface orthogonal to the first and second exterior surfaces of the first member,
the third exterior surface of the second member is disposed opposite to a surface of the second member to which the first member is connected, and
the third solid-state light source is disposed opposite to the third exterior surface of the second member.

18. The light source device according to claim 17, further comprising:
a flow channel formed in the cooling member, the flow channel being configured to contain a circulating fluid maintained at a temperature.

19. The light source device according to claim 17, further comprising:
a thermoelectric element provided between at least one solid-state light source of the plurality of solid-state light sources and the cooling member.

20. The light source device according to claim 17, wherein the plurality of solid-state light sources includes a plurality of lasers.

* * * * *